(12) United States Patent
Martin

(10) Patent No.: US 9,456,164 B2
(45) Date of Patent: Sep. 27, 2016

(54) UNIVERSAL REMOTE CONTROL THAT IS AUTOMATICALLY PROGRAMMABLE ACCORDING TO LOCATION

(71) Applicant: U-Me Holdings LLC, Carthage, MO (US)

(72) Inventor: Derek P. Martin, Carthage, MO (US)

(73) Assignee: U-Me Holdings LLC, Carthage, MO (US)

( * ) Notice: Subject to any disclaimer, the term of this patent is extended or adjusted under 35 U.S.C. 154(b) by 279 days.

(21) Appl. No.: 14/132,104

(22) Filed: Dec. 18, 2013

(65) Prior Publication Data

US 2015/0062441 A1    Mar. 5, 2015

Related U.S. Application Data

(63) Continuation-in-part of application No. 14/016,038, filed on Aug. 30, 2013, now Pat. No. 9,118,670.

(51) Int. Cl.
| | |
|---|---|
| *H04N 5/44* | (2011.01) |
| *H04N 21/422* | (2011.01) |
| *H04N 21/45* | (2011.01) |
| *H04N 21/81* | (2011.01) |
| *H04N 21/41* | (2011.01) |

(52) U.S. Cl.
CPC ........ *H04N 5/4403* (2013.01); *H04N 21/4222* (2013.01); *H04N 21/42207* (2013.01); *H04N 21/42209* (2013.01); *H04N 21/42224* (2013.01); *H04N 21/42225* (2013.01); *H04N 21/42226* (2013.01); *H04N 21/4508* (2013.01); *H04N 21/4524* (2013.01); *H04N 21/8186* (2013.01); *H04N 21/4131* (2013.01); *H04N 2005/443* (2013.01); *H04N 2005/4425* (2013.01); *H04N 2005/4435* (2013.01)

(58) Field of Classification Search
CPC .............. G08C 17/02; G08C 2201/91; G08C 2201/92; H04N 5/4403; H04N 21/4622; H04N 21/4307; H04N 21/4826
See application file for complete search history.

(56) References Cited

U.S. PATENT DOCUMENTS

| | | |
|---|---|---|
| 5,381,526 A | 1/1995 | Elison |
| 6,182,212 B1 | 1/2001 | Atkins et al. |
| 6,370,646 B1 | 4/2002 | Goodman et al. |
| 6,658,415 B1 | 12/2003 | Brown et al. |
| 7,509,672 B1 | 3/2009 | Horwitz et al. |
| 7,686,682 B2 | 3/2010 | Diakopoulos et al. |
| 7,716,157 B1 | 5/2010 | Bourdev et al. |
| 7,783,674 B2 | 8/2010 | Henrickson et al. |
| 7,788,267 B2 | 8/2010 | Wolas-Shiva et al. |
| 7,844,591 B1 | 11/2010 | Lettau et al. |
| 7,916,976 B1 | 3/2011 | Kedikian |
| 8,081,198 B1 | 12/2011 | Ayers et al. |
| 8,312,547 B1 | 11/2012 | Sobel et al. |
| 8,359,637 B2 | 1/2013 | Yau et al. |

(Continued)

*Primary Examiner* — Nabil Syed
(74) *Attorney, Agent, or Firm* — Martin & Associates, LLC; Derek P. Martin

(57) ABSTRACT

A universal remote control allows dynamically programming the remote control according to location. The remote control includes a communication interface that allows the remote control to communicate with a remote database. A location is specified, and the remote control uses the location information to access corresponding programming information for the remote control. The remote control is then dynamically reprogrammed according to the location information to make the remote control suitable to the location.

7 Claims, 28 Drawing Sheets

(56) References Cited

U.S. PATENT DOCUMENTS

| | | |
|---|---|---|
| 8,396,893 B2 | 3/2013 | Gaffga et al. |
| 8,667,541 B1 * | 3/2014 | Zhu .................. H04N 21/4622 455/456.2 |
| 2002/0104080 A1 | 8/2002 | Woodard et al. |
| 2002/0138582 A1 | 9/2002 | Chandra et al. |
| 2003/0134648 A1 | 7/2003 | Reed et al. |
| 2005/0066317 A1 | 3/2005 | Alda et al. |
| 2006/0125652 A1 * | 6/2006 | Zigmond ............... G08C 17/02 340/12.52 |
| 2007/0288966 A1 | 12/2007 | Javid et al. |
| 2008/0200209 A1 | 8/2008 | Cahoon |
| 2009/0055396 A1 | 2/2009 | Svendsen et al. |
| 2010/0030766 A1 | 2/2010 | Li et al. |
| 2010/0075631 A1 | 3/2010 | Black et al. |
| 2010/0130255 A1 | 5/2010 | Wong |
| 2010/0135597 A1 | 6/2010 | Gokturk et al. |
| 2010/0223341 A1 | 9/2010 | Manolescu et al. |
| 2011/0023081 A1 * | 1/2011 | Mornhineway ........ G08C 17/02 725/151 |
| 2011/0026853 A1 | 2/2011 | Gokturk et al. |
| 2011/0034176 A1 | 2/2011 | Lord et al. |
| 2011/0212717 A1 | 9/2011 | Rhoads et al. |
| 2011/0307491 A1 | 12/2011 | Fisk |
| 2012/0079601 A1 | 3/2012 | Gava et al. |
| 2013/0169546 A1 | 7/2013 | Thomas et al. |
| 2013/0204866 A1 | 8/2013 | Fork et al. |

* cited by examiner

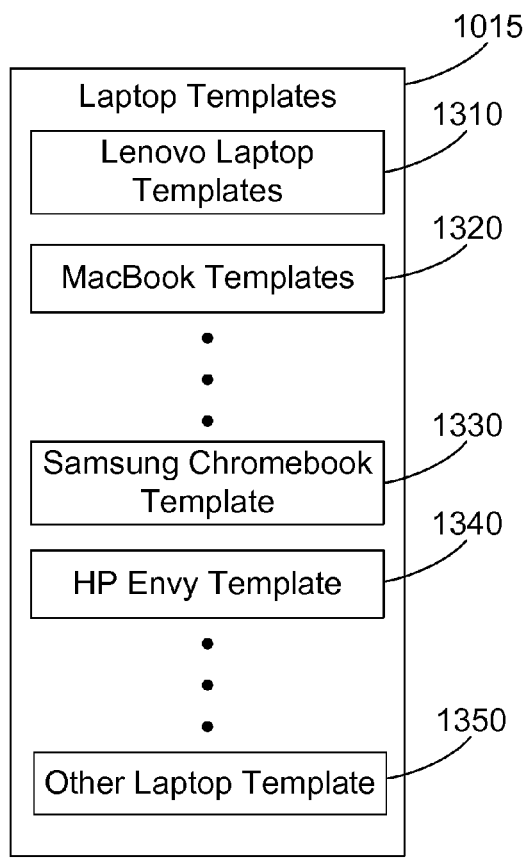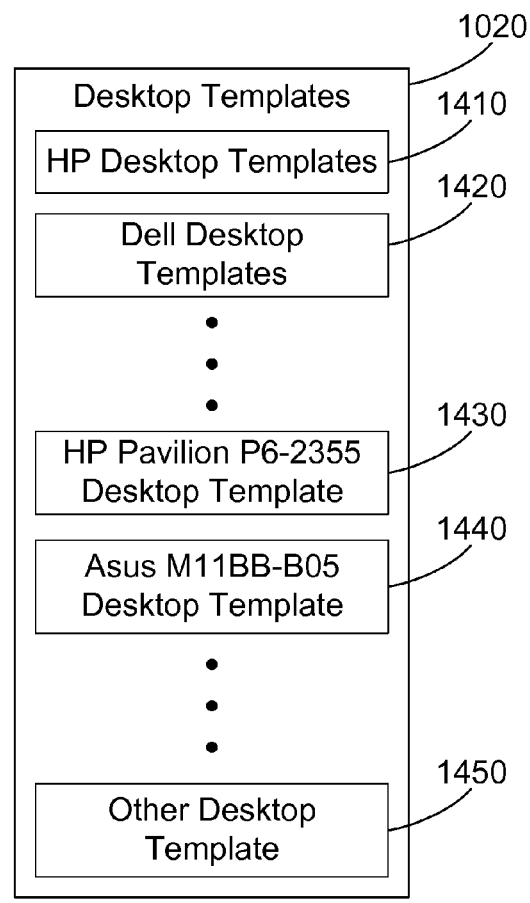
FIG. 13
FIG. 14

FIG. 31 — 3100

| DirecTV/Dish Network Mapping | | |
|---|---|---|
| Channel | DirecTV Channel | Dish Network Channel |
| CNN | 202 | 200 |
| Fox News | 360 | 205 |
| HBO | 501 | 300 |
| TNT | 245 | 138 |
| ESPN | 206 | 140 |
| TLC | 280 | 183 |
| ABC | local | local |
| NBC | local | local |
| CBS | local | local |
| Fox | local | local |

FIG. 32 — 835

| User Television Settings | |
|---|---|
| Favorite Channels List(s) | 3210 |
| Shows Set to Record | 3220 |
| Blocked Channels | 3230 |
| Parental Controls | 3240 |
| Channel Numbers for Stations | 3250 |
| Unlock Password | 3260 |

Types of Remote Controls

Smart Phone with App
Smart Phone with External Hardware and App
Tablet Computer with App
Tablet Computer with External Hardware and App
Dedicated Universal Remote Control

UNIVERSAL REMOTE CONTROL THAT IS AUTOMATICALLY PROGRAMMABLE ACCORDING TO LOCATION

BACKGROUND

1. Technical Field

This disclosure generally relates to remote controls, and more specifically relates to a remote control that can be automatically programmed based on location.

2. Background Art

Most home electronics come with dedicated remote controls. When a person has many different electronic devices to control, the result can be many different remote controls sitting on an end table or coffee table. It is frustrating for a user to fumble through many different remote controls to find the right one, then to figure out which buttons to push to accomplish the function the user wants. To eliminate having to deal with many different remote controls with different key layouts, universal remote controls were developed that can be programmed to control multiple pieces of equipment using the same keys. For example, a universal remote control could include buttons for TV, DVR, Receiver and DVD. A user can push one of these buttons, and the user's key presses will then control the corresponding equipment. Universal remote controls have greatly reduced the number of remote controls the user must deal with to control the user's home electronics. These remote controls are called "universal remotes" because of the ability to program them to accommodate a large number of devices from many different vendors.

Programming a universal remote control to control a wide variety of different electronic equipment from a number of different vendors is possible because the universal remote control can include a database of vendor models of equipment and corresponding codes for controlling the equipment. By the user selecting a vendor model or code, the remote control can program itself for the set of codes to control the vendor's equipment. This process can be repeated for each piece of equipment the user wants to control with the universal remote control. Thus, a user could program a known universal remote control to control a Samsung television, a DirecTV digital video recorder (DVR), and a Sony DVD player. The ability to program a universal remote control to support different equipment provides the capability for a user to customize the remote control. However, once the remote control is programmed for the user's equipment, the programming for the remote control typically does not change until the user adds a new piece of equipment or replaces an existing piece of equipment with different equipment.

Some universal remote controls use touch-screens that display graphical symbols called icons that may be selected by a user to perform certain functions. Thus, a CNN icon on a universal remote control with a touch screen may be presented, and when the user selects the CNN icon by pressing on the CNN icon on the touch screen, the remote control will send the appropriate command to change the channel to CNN.

BRIEF SUMMARY

A universal remote control allows dynamically programming the remote control according to location. The remote control includes a communication interface that allows the remote control to communicate with a remote database. A location is specified, and the remote control uses the location information to access corresponding programming information for the remote control. The remote control is then dynamically reprogrammed according to the location information to make the remote control suitable to the location.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 13 is a block diagram showing examples of laptop templates;

FIG. 14 is a block diagram showing examples of desktop templates;

FIG. 31 is a table showing mapping of some channel numbers for DirecTV to channel numbers for Dish Network;

FIG. 32 is a table showing examples of user television settings;

DETAILED DESCRIPTION

Figure 1:
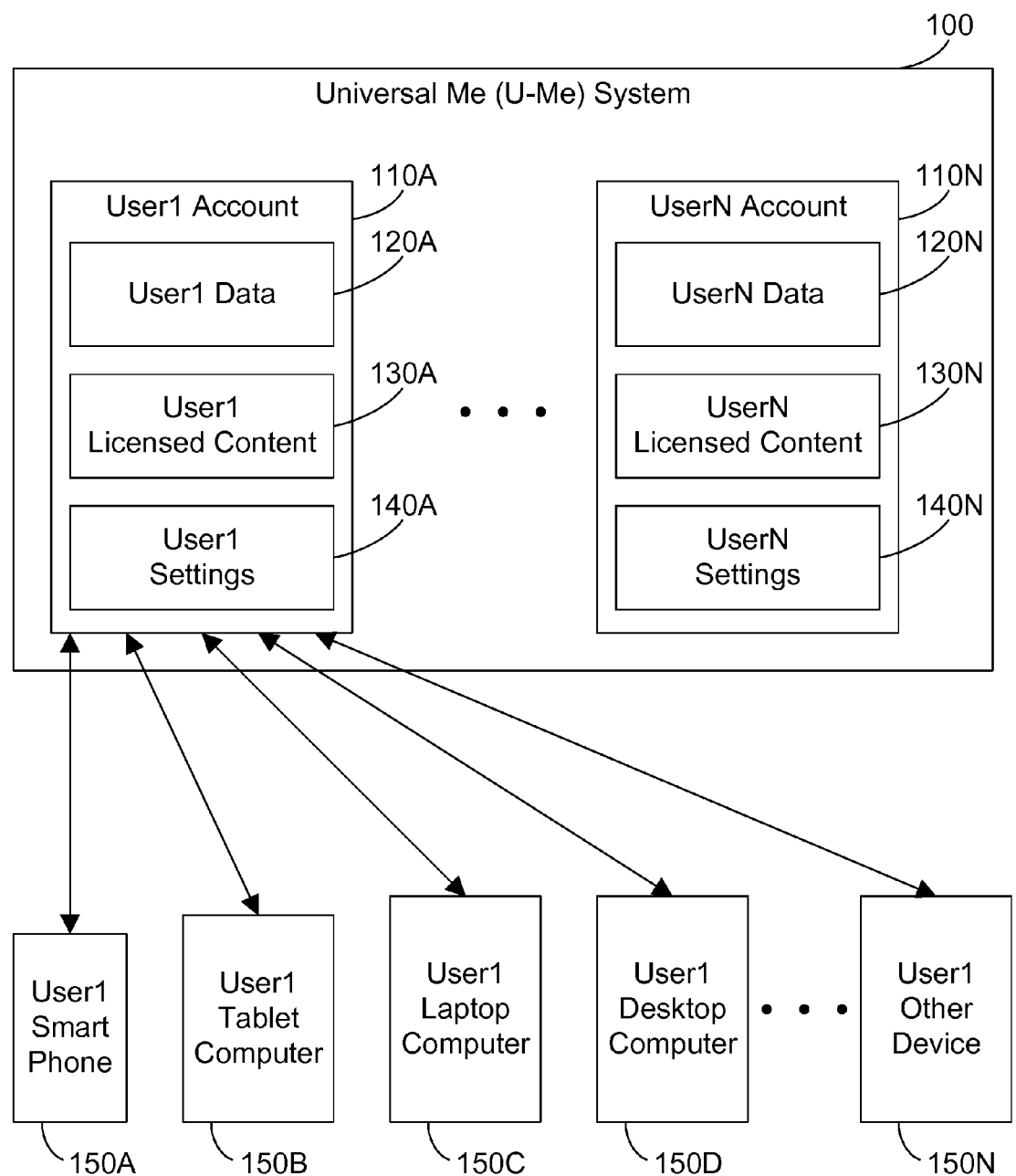
FIG. 1 is block diagram showing the Universal Me (U-Me) system.

The evolution of technology has resulted in a device-centric world. Early desktop computer systems allowed a user to define certain settings or preferences that defined how the computer system functioned. This trend has continued to our modern times. Each computer system allows installing software according to the user's needs, and allows setting numerous settings or preferences that define how the computer system functions. A user who buys a new computer system typically must spend many hours installing software and setting user preferences and settings to get the computer system to a state where it is usable according to the user's needs.

The same device-centric approach has been used with cell phones, and now with smart phones. When a user purchases a new phone, the user typically must spend many hours installing apps and setting the appropriate preferences and settings so the smart phone will perform the functions the user desires. Some phone vendors provide a service that can transfer a person's contacts from their old phone to the new phone, and some provide a backup service for those contacts should the person lose or damage their phone. This backup service, however, typically backs up only the contacts, and does not back up apps or settings on the phone. Thus, even with the backup service, when a user gets a new phone, the user still spends hours downloading and installing apps, ringtones, etc. and setting all the system settings to configure the phone to the user's liking.

While many aspects of modern life have been simplified through the use of technology, other aspects have yet to take advantage of technology in a significant way. For example, let's assume a person is watching television (TV), and the TV has a failure that causes the TV to quit working. The user may then try to remember where she bought the TV, when she bought the TV, and whether the TV is still under warranty. The user must typically then locate a stack or file of paper receipts, then go through the stack or file hoping to find the paper receipt for the TV. Even when the user is able to locate the paper receipt, the receipt itself may not indicate the warranty information for the TV. She may have to search for the hard copy documentation she received with the TV. In the alternative, she could contact the store or the manufacturer to determine the warranty for the TV. And when the TV is under warranty, the user will have to make a photocopy of the receipt and send the copy of the receipt with the TV when the TV is returned for warranty service. This system of paper receipts is grossly inefficient, and does not benefit from technology available today.

One aspect of modern life that has been greatly simplified through the use of technology is how music is purchased and used. Apple's iPod was a revolutionary device that allowed storing a large number of songs, which the user may listen to at his or her convenience. To satisfy concerns in the music industry regarding the ease of pirating (performing illegal copying) of digital music files, Apple developed the iTunes software application that allows a user to purchase music, which is stored on the user's computer system in their iTunes account. This music may be copied from the computer system to a suitable Apple device, such as an iPod or iPad. However, music from an iPod or iPad cannot be copied to the user's computer because this would make illegal copying of music very easy. Thus, all of a user's music is stored in the user's computer system in their iTunes software. So what happens when the user's hard drive crashes? Recovering the music in an iTunes account that was on a hard drive that crashed is not an easy process. This is because the iTunes account is tied to the computer system on which iTunes is installed. This shows that iTunes is device-centric as well, which means if the device that hosts iTunes crashes, the music that was stored on the device is difficult to recover.

Another aspect of our modern life that has not fully taken advantage of modern technology is data storage and retrieval. As referenced in the Background section above, Dropbox is an online service that allows storing information to the cloud. However, Dropbox is based on the folder/subfolder (or directory/subdirectory) paradigm. Thus, when using Dropbox, the user must remember to store the data in a Dropbox folder or subfolder, and then must also store the data in a location and use a file name the user is likely to remember. Relying on the memory of a user to remember where the user stored something on a computer system is very inefficient and error-prone. Many users have experienced storing a file to their computer system, then having to search many files across many directories in an attempt to locate the file they stored. Database systems provide very structured ways of storing information, which results in supporting very powerful ways of retrieving information in the database via queries. However, these powerful database tools for storing and retrieving information have not been employed in helping most users to store and retrieve information on their computer systems or smart phones.

Photography is an area that has greatly benefitted from modern technology. Digital cameras and cell phones allow capturing very high-resolution photographs and video in digital form that can be easily stored to an electronic device. While photography itself has been revolutionized by technology, the technology for storing and retrieving photographs has lagged far behind. Many people who have used digital cameras for years have many directories or folders on a computer system that contain thousands of digital photos and videos. When a person uses a digital camera or cell phone to take a photo, the device typically names the photo with a cryptic name that includes a number that is sequential. For example, a Nikon camera may name a photo file with a name such as "DSC_0012.jpg.". The digital file for the next photo is the next number in sequence, such as DSC_0013.jpg. Once the photo files are transferred to a computer and are deleted on the digital camera or cell phone, the digital camera or cell phone may reuse file names that were used previously. To avoid overwriting existing photos, many users choose to create a new directory or folder each time photos are downloaded from a camera or cell phone. This results in two significant problems. First, the file name for a photo may be shared by multiple photos in multiple directories. Second, the names of files give the user no information regarding the photo. Thus, to locate a particular photo of interest, the user may have to navigate a large number of directories, searching thumbnails of the photos in each directory to locate the desired photo. This is grossly inefficient and relies on the memory of the user to locate a desired photo. A user can more efficiently locate photos if the user takes the time to carefully name directories or folders and also takes the time to carefully name individual photo files. But this is very time-consuming, and most users don't take the time needed to name folders and photo files in a way that would make retrieval of the photos easier. Most people who take digital photos have thousands of photos that have cryptic names in dozens or hundreds of different directories or folders that may also have cryptic names. The result is that finding a particular photo may be very difficult.

While there are programs that allow organizing digital photos, they have not gained widespread acceptance due to their expense and the time required and difficulty for a user to organize their photos using these programs. As a result, these programs have done little to address the widespread problem of most users having thousands of digital photos that are stored using cryptic names in many different directories or folders, making retrieval of photographs difficult.

The disclosure herein presents a paradigm shift, from the device-centric world we live in today, to a person-centric world. This shift gives rise to many different opportunities that are not available in the world we live in today. A system called Universal Me (U-Me) disclosed herein is a cloud-based system that is person-centric. The U-Me system makes a user's data, licensed content and settings available in the cloud to any suitable device that user may choose to use.

Referring to FIG. 1, the Universal Me (U-Me) system 100 includes multiple user accounts 110, shown in FIG. 1 as 110A, ..., 110N. Each user account includes data, licensed content, and settings that correspond to the user. Thus, User1 account 110A includes corresponding data 120A, licensed content 130A, and settings 140A. In similar fashion, UserN account 110N includes corresponding data 120N, licensed content 130N, and settings 140N. Any or all of the user's data, licensed content and settings may be made available on any device 150 the user may use. Examples of suitable devices are shown in FIG. 1 to include a smart phone 150A, a tablet computer 150B, a laptop computer 150C, a desktop computer 150D, and other device 150N. The devices shown in FIG. 1 are examples of suitable devices the user could use to access any of the data, licensed content, or settings in the user's account. The disclosure and claims herein expressly extend to using any type of device to access the user's data, licensed content, or settings, whether the device is currently known or developed in the future.

Figure 2:
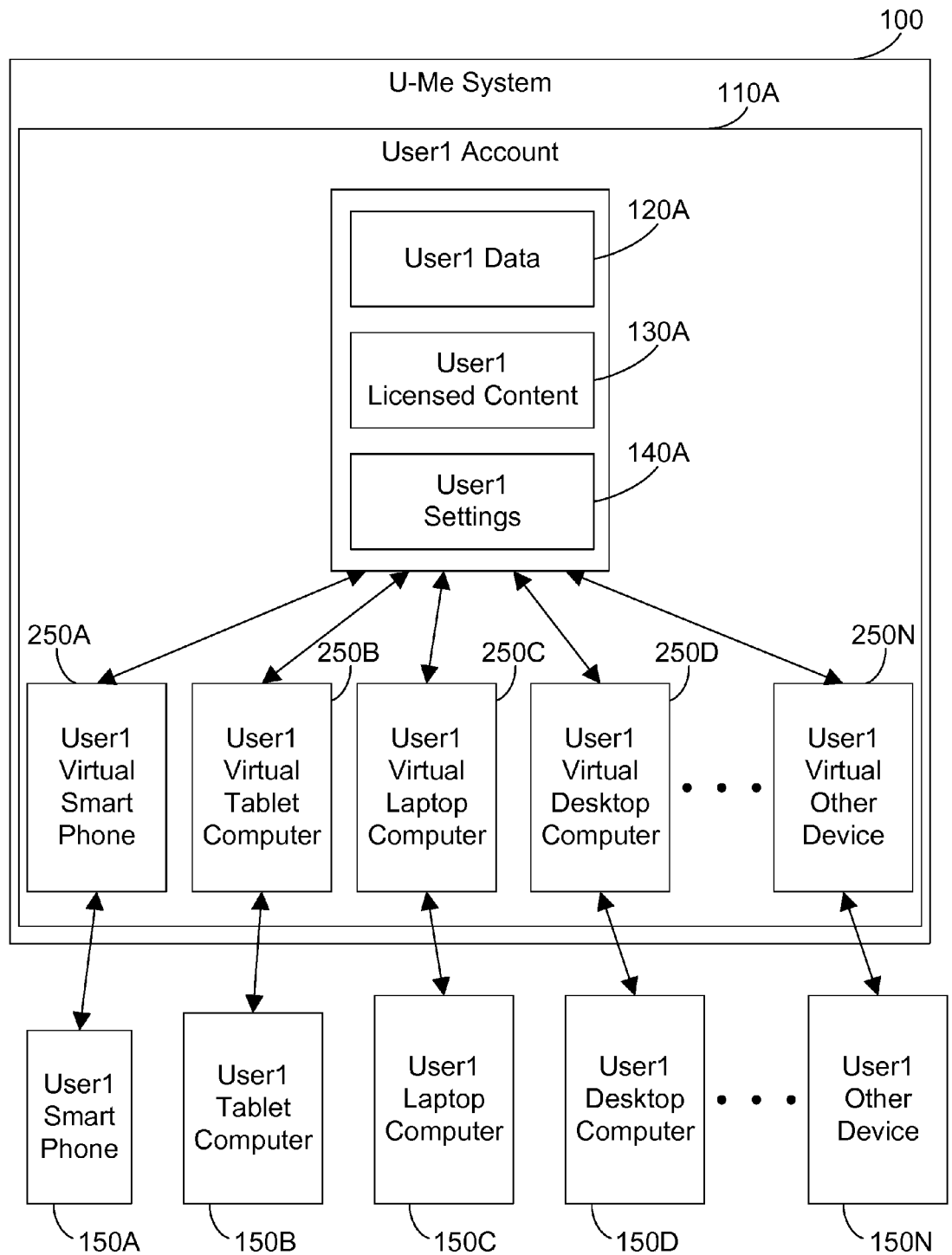
FIG. 2 is block diagram showing additional details of the U-Me system.

The U-Me system 100 may include virtual devices in a user's account. Referring to FIG. 2, the User1 account 110A is shown to include a virtual smart phone 250A that corresponds to the physical smart phone 150A; a virtual tablet computer 250B that corresponds to the physical tablet computer 150B; a virtual laptop computer 250C that corresponds to the physical laptop computer 150C; a virtual desktop computer 250D that corresponds to a physical desktop computer 150D; and a virtual other device 250N that corresponds to a physical other device 150N. The virtual devices preferably include all information that makes a physical device function, including operating system software and settings, software applications (including apps) and their settings, and user settings. It may be impossible due to access limitations on the physical device to copy all the information that makes the physical device function. For example, the operating system may not allow for the operating system code to be copied. The virtual devices contain as much information as they are allowed to contain by the physical devices. In the most preferred implementation, the virtual devices contain all information that makes the physical devices function. In this scenario, if a user accidentally flushes his smart phone down the toilet, the user can purchase a new smart phone, and all the needed information to configure the new smart phone exactly as the old one is available in the virtual smart phone stored in the user's U-Me account. Once the user downloads a U-Me app on the new smart phone, the phone will connect to the user's U-Me account, authenticate the user, and the user will then have the option of configuring the new device exactly as the old device was configured using the information in the virtual smart phone in the user's U-Me account.

There may be some software on a physical device that cannot be copied to the corresponding virtual device. When this is the case, the U-Me account will prompt the user with a list of things to do before the new physical device can be configured using the data in the virtual device. For example, if the user had just applied an operating system update and the new phone did not include that update, the user will be prompted to update the operating system before continuing. If an app installed on the old phone cannot be copied to the user's U-Me account, the U-Me app could prompt the user to install the app before the rest of the phone can be configured. The virtual device preferably contains as much information as possible for configuring the new device, but when information is missing, the U-Me system prompts the user to perform certain tasks as prerequisites. Once the tasks have been performed by the user, the U-Me system can take over and configure the phone using the information stored in the corresponding virtual device.

Figure 3:
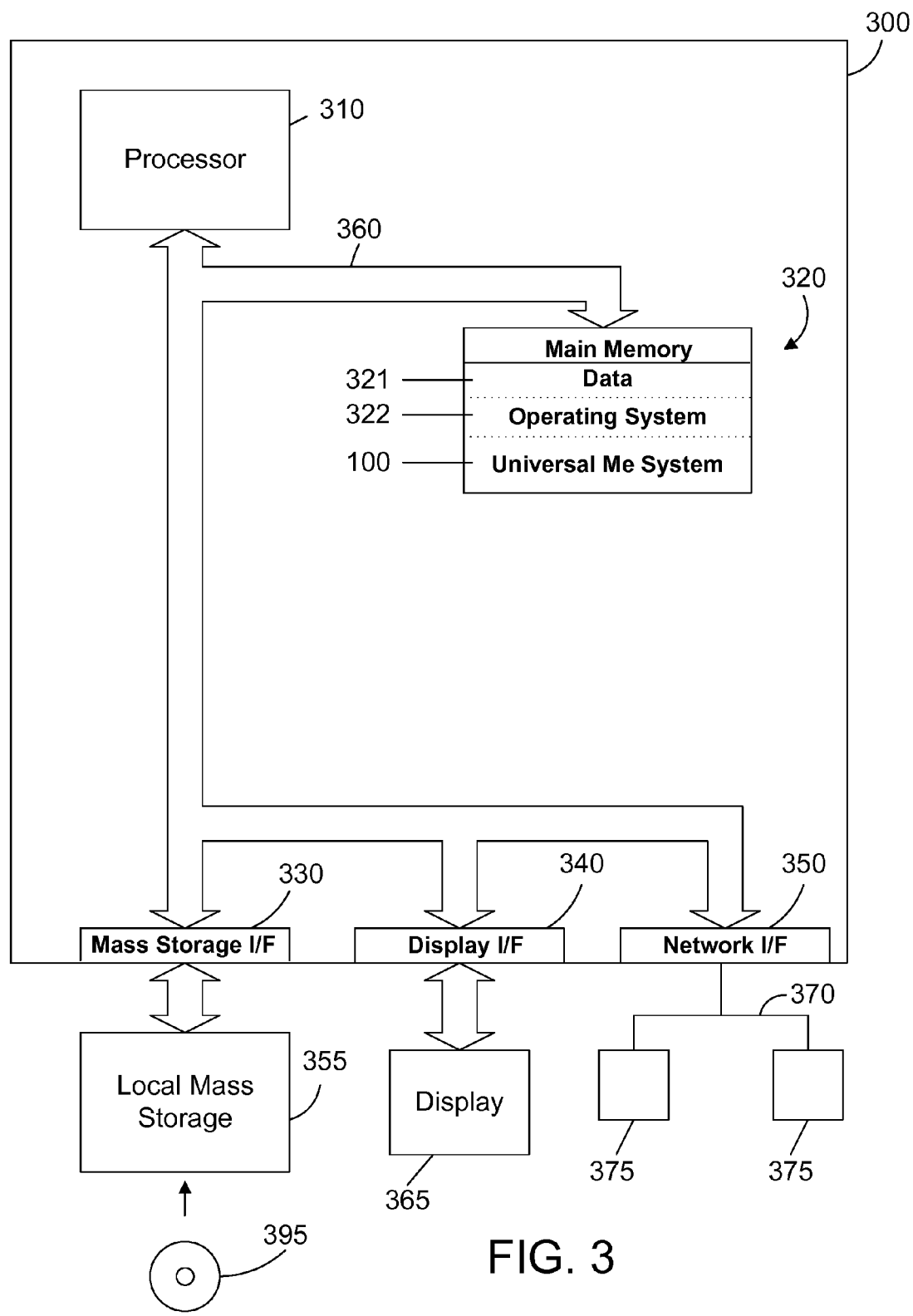
FIG. 3 is block diagram showing a computer system that runs the U-Me system.

Referring to FIG. 3, a computer system 300 is an example of one suitable computer system that could host the universal me system 100. Server computer system 300 is an IBM System i computer system. However, those skilled in the art will appreciate that the disclosure and claims herein apply equally to any computer system, regardless of whether the computer system is a complicated multi-user computing apparatus, a single user workstation, or an embedded control system. As shown in FIG. 3, computer system 300 comprises one or more processors 310, a main memory 320, a mass storage interface 330, a display interface 340, and a network interface 350. These system components are interconnected through the use of a system bus 360. Mass storage interface 330 is used to connect mass storage devices, such as local mass storage device 355, to computer system 300. One specific type of local mass storage device 355 is a readable and writable CD-RW drive, which may store data to and read data from a CD-RW 395.

Main memory 320 preferably contains data 321, an operating system 322, and the Universal Me System 100. Data 121 represents any data that serves as input to or output from any program in computer system 100. Operating system 322 is a multitasking operating system. The Universal Me System 100 is the cloud-based system described in detail in this specification. The Universal Me System 100 as shown in FIG. 3 is a software mechanism that provides all of the functionality of the U-Me system.

Computer system 300 utilizes well known virtual addressing mechanisms that allow the programs of computer system 300 to behave as if they only have access to a large, contiguous address space instead of access to multiple, smaller storage entities such as main memory 320 and local mass storage device 355. Therefore, while data 321, operating system 322, and Universal Me System 100 are shown to reside in main memory 320, those skilled in the art will recognize that these items are not necessarily all completely contained in main memory 320 at the same time. It should also be noted that the term "memory" is used herein generically to refer to the entire virtual memory of computer system 300, and may include the virtual memory of other computer systems coupled to computer system 300.

Processor 310 may be constructed from one or more microprocessors and/or integrated circuits. Processor 310 executes program instructions stored in main memory 320. Main memory 320 stores programs and data that processor 310 may access. When computer system 300 starts up, processor 310 initially executes the program instructions that make up the operating system 322. Processor 310 also executes the Universal Me System 100.

Although computer system 300 is shown to contain only a single processor and a single system bus, those skilled in the art will appreciate that the universal me system may be practiced using a computer system that has multiple processors and/or multiple buses. In addition, the interfaces that are used preferably each include separate, fully programmed microprocessors that are used to off-load compute-intensive processing from processor 310. However, those skilled in the art will appreciate that these functions may be performed using I/O adapters as well.

Display interface 340 is used to directly connect one or more displays 365 to computer system 300. These displays 365, which may be non-intelligent (i.e., dumb) terminals or fully programmable workstations, are used to provide system administrators and users the ability to communicate with computer system 300. Note, however, that while display interface 340 is provided to support communication with one or more displays 365, computer system 300 does not necessarily require a display 365, because all needed interaction with users and other processes may occur via network interface 350.

Network interface 350 is used to connect computer system 300 to other computer systems or workstations 375 via network 370. Network interface 350 broadly represents any suitable way to interconnect electronic devices, regardless of whether the network 370 comprises present-day analog and/or digital techniques or via some networking mechanism of the future. Network interface 350 preferably includes a combination of hardware and software that allow communicating on the network 370. Software in the network interface 350 preferably includes a communication manager that manages communication with other computer systems 375 via network 370 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 350.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
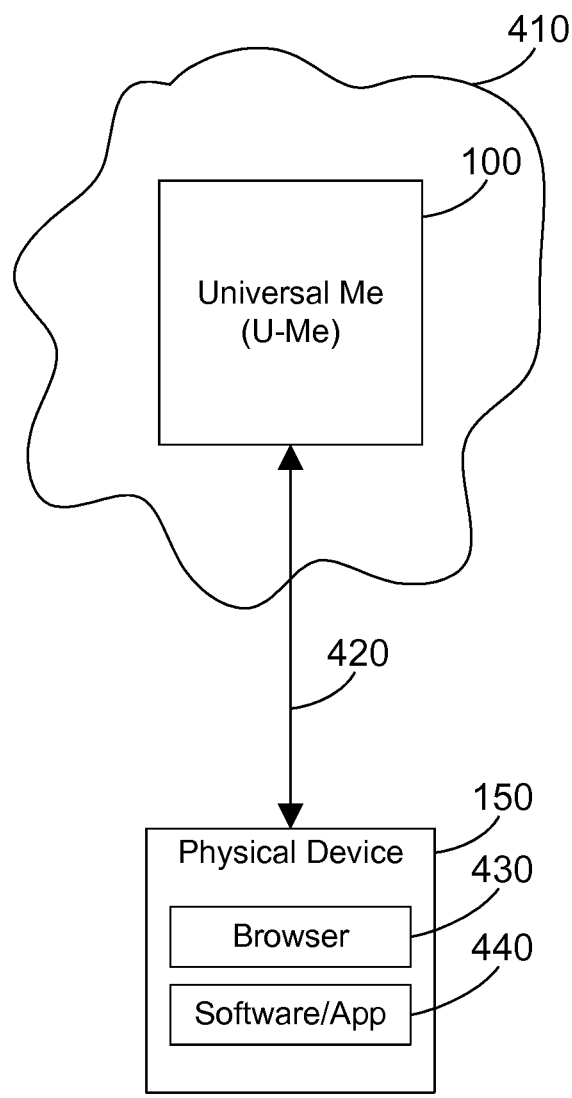
FIG. 4 is a block diagram showing how a user using a physical device can access information in the U-Me system.

FIG. 4 shows another view of a configuration for running the U-Me system 100. The U-Me system 100 runs in a cloud, shown in FIG. 4 as cloud 410. A user connects to the U-Me system 100 using some physical device 150 that may include a browser 430 and/or software 440 (such as an application or app) that allows the user to interact with the U-Me system 100. Note the physical device 150 is connected to the U-Me system 100 by a network connection 420, which is representative of network 370 shown in FIG. 3, and which can include any suitable wired or wireless network or combination of networks. The network connection 420 in the most preferred implementation is an Internet connection, which makes the U-Me system available to any physical device that has Internet access. Note, however, other types of networks may be used, such as satellite networks and wireless networks. The disclosure and claims herein expressly extend to any suitable network or connection for connecting a physical device to the U-Me system 100.

Figure 5:
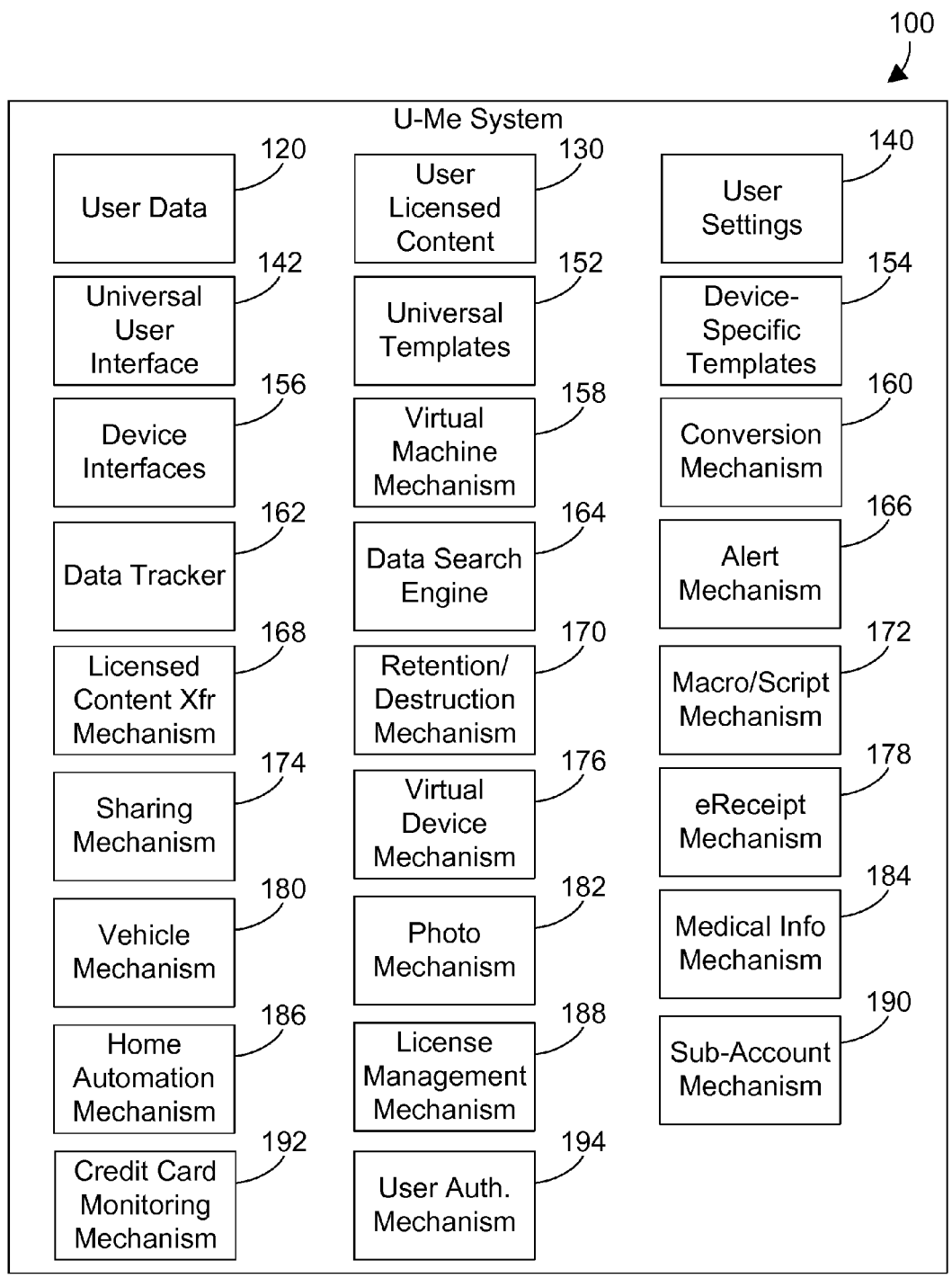
FIG. 5 is a block diagram showing various features of the U-Me system.

Various features of the U-Me system are represented in FIG. 5. U-Me system 100 includes user data 120, user licensed content 130, and user settings 140, as the specific examples in FIGS. 1 and 2 illustrate. U-Me system 100 further includes a universal user interface 142, universal templates 152, device-specific templates 154, device interfaces 156, a virtual machine mechanism 158, a conversion mechanism 160, a data tracker 162, a data search engine 164, an alert mechanism 166, a licensed content transfer mechanism 168, a retention/destruction mechanism 170, a macro/script mechanism 172, a sharing mechanism 174, a virtual device mechanism 176, an eReceipt mechanism 178, a vehicle mechanism 180, a photo mechanism 182, a medical info mechanism 184, a home automation mechanism 186, a license management mechanism 188, a sub-account mechanism 190, a credit card monitoring mechanism 192, and a user authentication mechanism 194. Each of these features is discussed in more detail below. The virtual devices 150 in FIG. 2 are preferably created and maintained by the virtual device mechanism 176 in FIG. 5.

Figure 6:
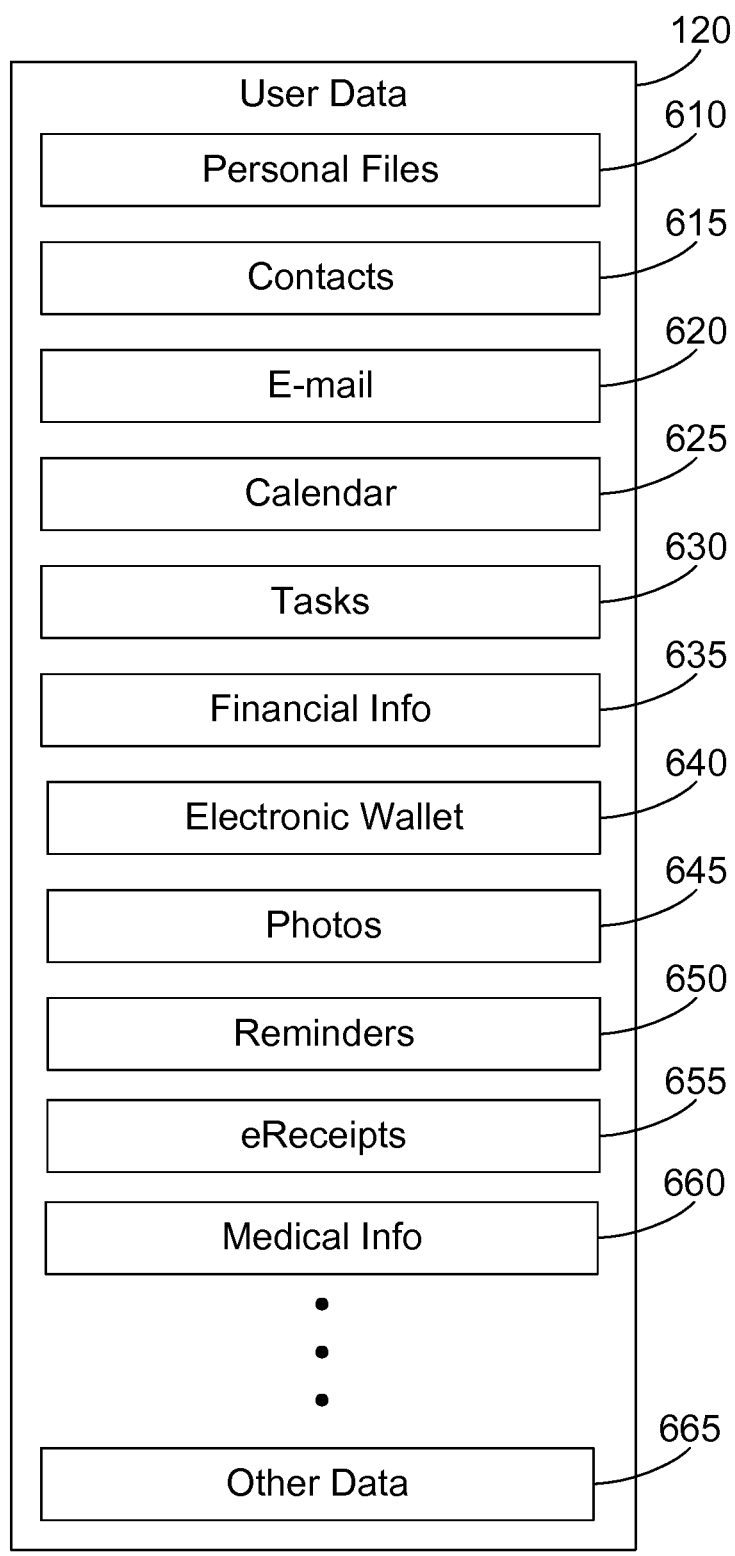
FIG. 6 is a block diagram showing examples of user data.

FIG. 6 shows some specific examples of user data 120 that could be stored in a user's U-Me account, including personal files 610, contacts 615, e-mail 620, calendar 625, tasks 630, financial info 635, an electronic wallet 640, photos 645, reminders 650, eReceipts 655, medical information 660, and other data 665. The user data shown in FIG. 6 are examples shown for the purpose of illustration. The disclosure and claims herein extend to any suitable data that can be generated by a user, generated for a user, or any other data relating in any way to the user, including data known today as well as data developed in the future.

Personal files 610 can include any files generated by the user, including word processor files, spreadsheet files, .pdf files, e-mail attachments, etc. Contacts 615 include information for a user's contacts, preferably including name, address, phone number(s), e-mail address, etc. E-mail 620 is e-mail for the user. E-mail 620 may include e-mail from a single e-mail account, or e-mail from multiple e-mail accounts. E-mail 620 may aggregate e-mails from different sources, or may separate e-mails from different sources into different categories or views. Calendar 625 includes an electronic calendar in any suitable form and format. Tasks 620 include tasks that a user may set and tasks set by the U-Me system. Financial info 625 can include any financial information relating to the user, including bank statements, tax returns, investment account information, etc. Electronic wallet 640 includes information for making electronic payments, including credit card and bank account information for the user. Google has a product for Android devices called Google Wallet. The electronic wallet 640 can include the features of known products such as Google Wallet, as well as other features not known in the art.

Photos 645 include electronic files for photographs and videos. While it is understood that a user may have videos that are separate from photographs, the term "photos" as used herein includes both photographs and videos for the sake of convenience in discussing the function of the U-Me system. Reminders 650 include any suitable reminders for the user, including reminders for events on the calendar 625, reminders for tasks 630, and reminders set by the U-Me system for other items or events. eReceipts 655 includes electronic receipts in the form of electronic files that may include warranty information and/or links that allow a user to make a warranty claim. Medical info 660 includes any suitable medical information relating to the user, including semi-private medical information, private medical information, and information provided by medical service providers, insurance companies, etc.

Figure 7:
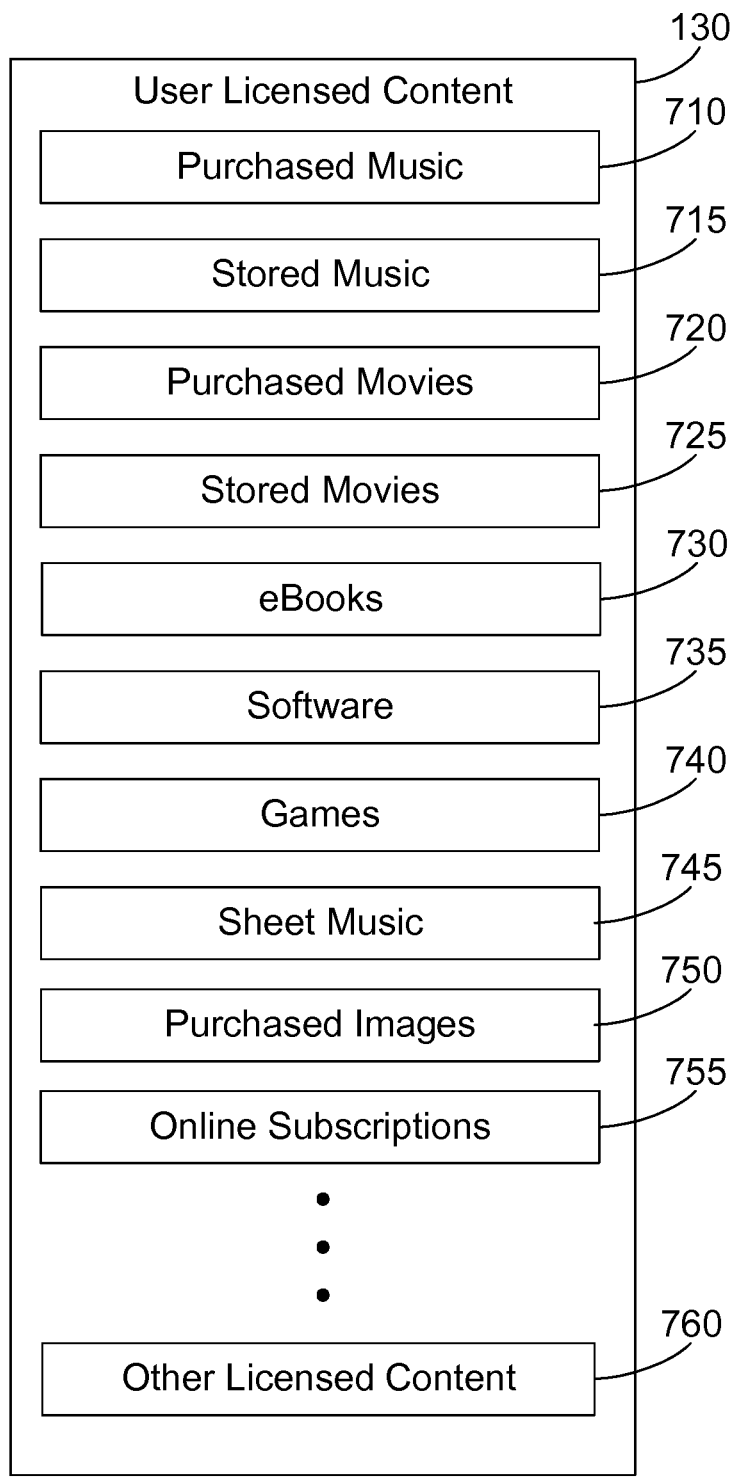
FIG. 7 is a block diagram showing examples of user licensed content.

FIG. 7 shows some specific examples of user licensed content 130 that could be stored in a user's U-Me account, including purchased music 710, stored music 715, purchased movies 720, stored movies 725, eBooks 730, software 735, games 740, sheet music 745, purchased images 750, online subscriptions 755, and other licensed content 760. The user licensed content shown in FIG. 7 are examples shown for the purpose of illustration. The disclosure and claims herein extend to any suitable user licensed content, including user licensed content known today as well as user licensed content developed in the future.

Purchased music 710 includes music that was purchased from an online source. Note the purchased music 710 could include entire music files, or could include license information that authorizes the user to stream a music file on-demand. Stored music 715 includes music the user owns and which has been put into electronic format, such as music recorded (i.e., ripped) from a compact disc. Purchased movies 720 include movies that were purchased from an online source. Note the purchased movies 720 could include an entire movie file, or could include license information that authorizes the user to stream a movie on-demand. Stored movies 725 include movies the user owns and which have been put into electronic format, such as movies recorded from a digital video disc (DVD). eBooks 730 include books for the Apple iPad, books for the Kindle Fire, and books for the Barnes & Noble Nook. Of course, eBooks 730 could include books in any suitable electronic format.

Software 735 includes software licensed to the user and/or to the user's devices. In the most preferred implementation, software is licensed to the user and not to any particular device, which makes the software available to the user on any device capable of running the software. However, software 735 may also include software licensed to a user for use on only one device, as discussed in more detail below. Software 735 may include operating system software, software applications, apps, or any other software capable of running on any device. In addition, software 735 may include a backup of all software stored on all devices used by the user. Games 740 include any suitable electronic games, including games for computer systems and any suitable gaming system. Known gaming systems include Sony Playstation, Microsoft Xbox, Nintendo Wii, and others. Games 740 may include any games for any platform, whether currently known or developed in the future. Sheet music 745 includes sheet music that has been purchased by a user and is in electronic form. This may include sheet music files that are downloaded as well as hard copy sheet music that has been scanned. Some pianos now include an electronic display screen that is capable of displaying documents such as sheet music files. If a user owns such a piano, the user could access via the piano all of the user's stored sheet music 745 in the user's U-Me account. Purchased images 750 include any images purchased by the user, including clip art, pictures, etc. Online subscriptions 755 include content generated by the user on a subscription basis by any suitable provider. For example, if a user subscribes to Time magazine online, the online subscriptions 755 could include electronic copies of Time magazine.

Figure 8:
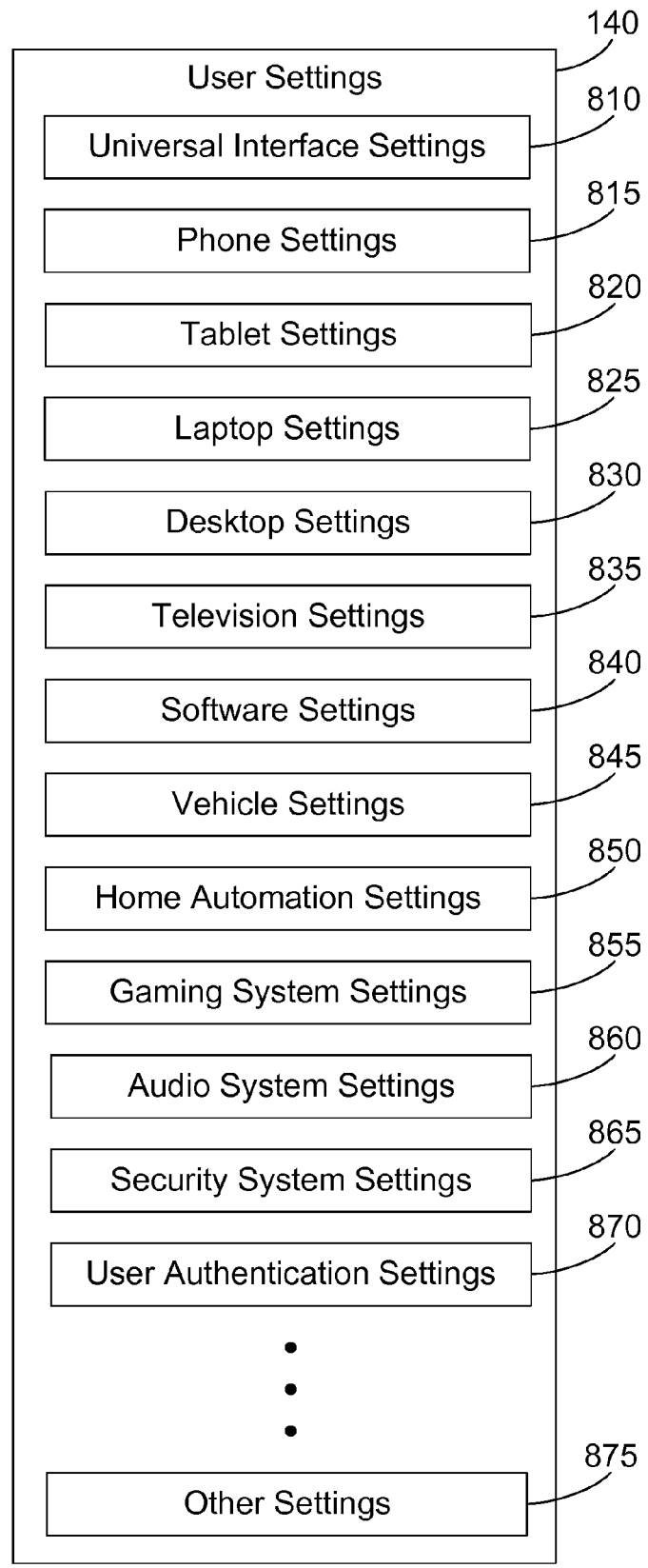
FIG. 8 is a block diagram showing examples of user settings.

FIG. 8 shows some specific examples of user settings 140 that could be stored in a user's U-Me account, including universal interface settings 810, phone settings 815, tablet settings 820, laptop settings 825, desktop settings 830, television settings 835, software settings 840, vehicle settings 845, home automation settings 850, gaming system settings 855, audio system settings 860, security system settings 865, user authentication settings 870, and other settings 875. The user settings shown in FIG. 8 are examples shown for the purpose of illustration. The software settings 840, which include user settings for software applications, include user preferences for each software application. Note the term "software application" is used herein to broadly encompass any software the user can use, whether it is operating system software, an application for a desktop, an app for a phone, or any other type of software. User settings for physical devices include user settings for each physical device. The term "physical device" is used herein to broadly any tangible device, whether currently known or developed in the future, that includes any combination of hardware and software. The disclosure and claims herein extend to any suitable user settings, including user settings known today as well as user settings developed in the future.

Universal interface settings 810 include settings for a universal interface for the U-Me system that can be presented to a user on any suitable device, which allows the user to interact with the U-Me system using that device. Phone settings 815 include settings for the user's phone, such as a smart phone. Apple iPhone and Samsung Galaxy S4 are examples of known smart phones. Tablet settings 820 include settings for the user's tablet computer. Examples of known tablet computers include the Apple iPad, Amazon Kindle, Barnes & Noble Nook, Samsung Galaxy Tab, and many others. Laptop settings 825 are settings for a laptop computer. Desktop settings 830 are settings for a desktop computer. Television settings 835 are settings for any suitable television device. For example, television settings 835 could include settings for a television, for a cable set-top box, for a satellite digital video recorder (DVR), for a remote control, and for many other television devices. Software settings 840 include settings specific to software used by the user. Examples of software settings include the configuration of a customizable menu bar on a graphics program such as Microsoft Visio; bookmarks in Google Chrome or favorites in Internet Explorer; default file directory for a word processor such as Microsoft Word; etc. Software settings 840 may include any suitable settings for software that may be defined or configured by a user.

Vehicle settings 845 include user settings relating to a vehicle, including such things as position of seats, position of mirrors, position of the steering wheel, radio presets, heat/cool settings, music playlists, and video playlists. Home automation settings 850 include settings for a home automation system, and may include settings for appliances, heating/ventilation/air conditioning (HVAC), lights, security, home theater, etc. Gaming system settings 855 include settings relating to any gaming system. Audio system settings 860 include settings for any suitable audio system, including a vehicle audio system, a home theater system, a handheld audio player, etc. The security system settings 865 may include settings for any suitable security system. User authentication settings 870 include settings related to the user's authentication to the U-Me system.

The U-Me system makes a user's data, licensed content, and settings available to the user on any device the user desires to use. This is a significant advantage for many reasons. First of all, even for people who are comfortable with technology, getting a device configured exactly as the user wants is time-consuming and often requires research to figure out how to configure the device. For example, let's assume a user installs the Google Chrome browser on a desktop computer. When the user downloads a file using Google Chrome, the downloaded file appears as a clickable icon on the lower left of the Google Chrome display. To open the file, the user clicks on the icon. Let's assume the user wants to always open .pdf files after they are downloaded. Because the user does not know how to configure Chrome to do this, the user does a quick search, and discovers that Chrome can be configured to always open .pdf files after they are downloaded by clicking on a down arrow next to the downloaded .pdf file icon, which brings up a pop-up menu, then selecting "Always open files of this type." This configures Google Chrome to always open .pdf files after they are downloaded. However, the user cannot be expected to remember this small tidbit of knowledge. If the user made this setting change to Google Chrome when the desktop computer was new, and two years passes when the user gets a new desktop computer, it is highly unlikely the user will remember how to configure Google Chrome to automatically open .pdf files after they are downloaded. In any modern device, there are dozens or perhaps hundreds of such user settings. By storing these user settings in the user's U-Me account, the user will not have to remember each and every setting the user makes in each and every device. The same is true for configuring a smart phone. Often users have to search online to figure out how to do certain things, such as setting different ringtones for different contacts. In today's world, such settings are lost when a user changes to a different phone, which requires the user repeat the learning process to configure the new phone. With the U-Me system disclosed herein, all of the user's settings are saved to the user's U-Me account, allowing a new device to be easily configured using the stored user settings.

While the previous paragraph discusses an example of a user setting in Google Chrome, similar concepts apply to user data and user licensed content. There is currently no known way to make all of a user's data, licensed content, and settings available in the cloud so this information is available to the user on any device or system the user decides to use. The Universal Me system solves this problem. The system is called Universal Me because it allows "me to be me, anywhere" for each user. Thus, a user on vacation on Italy could find an Internet café, use a computer in the Internet café to access the user's universal interface to the U-Me system, and would then have access to all of the user's data, licensed content, and settings. Similarly, the user could borrow an iPad from a friend, and have access to all the user's data, licensed content, and settings. The power and flexibility of the U-Me system leads to its usage in many different scenarios, several of which are described in detail below.

While many different categories of user settings are shown in FIG. 8, these are shown by way of example. A benefit of the U-Me system is that a user only has to configure a device once, and the configuration for that device is stored in the user's U-Me account. Replacing a device that is lost, stolen, or broken is a simple matter of buying a new similar device, then following the instructions provided by the U-Me system to configure the new device to be identical to the old device. In the most preferred implementation, the U-Me system will back up all user data, licensed content, and settings related to the device to the user's U-Me account, which will allow the U-Me system to configure the new device automatically with minimal input from the user. However, features of the devices themselves may prevent copying all the relevant data, licensed content and settings to the user's U-Me account. When this is the case, the U-Me system will provide instructions to the user regarding what steps the user needs to take before the U-Me system can configure the device with the information stored in the user's U-Me account.

Figure 9:
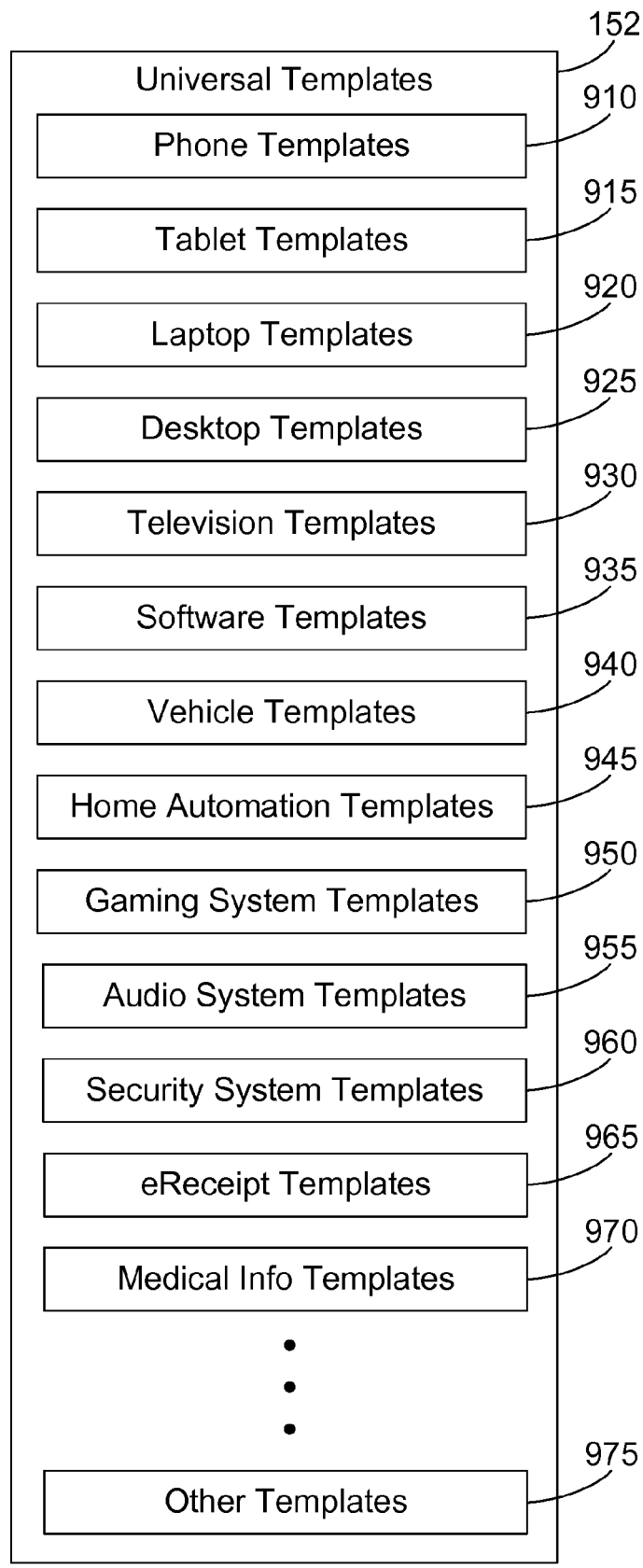
FIG. 9 is a block diagram showing examples of universal templates.

The U-Me system could use various templates that define settings for different physical devices. Referring to FIG. 9, universal templates 152 include phone templates 910, tablet templates 915, laptop templates 920, desktop templates 925, television templates 930, software templates 935, vehicle templates 940, home automation templates 945, gaming system templates 950, audio system templates 955, security system templates 960, eReceipt templates 965, medical information templates 970, and other templates 975. The universal templates shown in FIG. 9 are examples shown for the purpose of illustration. The disclosure and claims herein extend to any suitable universal templates, including universal templates related to devices known today as well as universal templates related to devices developed in the future.

The various universal templates in FIG. 9 include categories of devices that may include user settings. One of the benefits of the U-Me system is the ability for a user to store settings for any device or type of device that requires configuration by the user. This allows a user to spend time once to configure a device or type of device, and the stored settings in the user's U-Me account will allow automatically configuring identical or similar devices. The U-Me system expressly extends to storing any suitable user data and/or user licensed content and/or user settings for any suitable device in a user's U-Me account.

The universal templates 152 provide a platform-independent way of defining settings for a particular type of device. Thus, a universal phone template may be defined by a user using the U-Me system without regard to which particular phone the user currently has or plans to acquire. Because the universal templates are platform-independent, they may include settings that do not directly map to a specific physical device. Note, however, the universal templates may include information uploaded from one or more physical devices. The universal template can thus become a superset of user data, user licensed content, and user settings for multiple devices. The universal templates can also include settings that do not correspond to a particular setting on a particular device.

Figure 10:
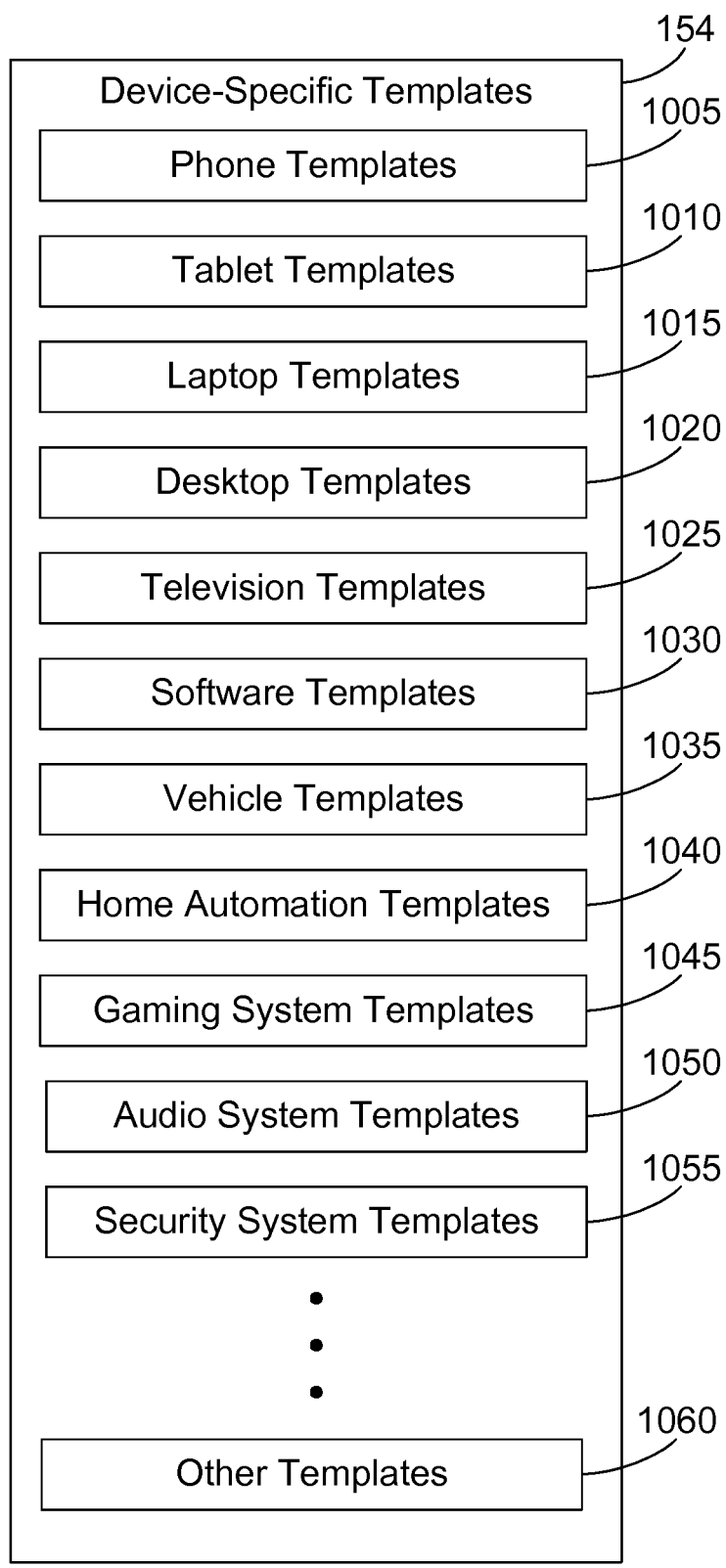
FIG. 10 is a block diagram showing examples of device-specific templates.

Referring to FIG. 10, device-specific templates 154 include phone templates 1005, tablet templates 1010, laptop templates 1015, desktop templates 1020, television templates 1025, software templates 1030, vehicle templates 1035, home automation templates 1040, gaming system templates 1045, audio system templates 1050, security system templates 1055, and other templates 1060. The device-specific templates shown in FIG. 10 are examples shown for the purpose of illustration. The disclosure and claims herein extend to any suitable device-specific templates, including device-specific templates for devices known today as well as device-specific templates for devices developed in the future.

Figures 11, 12:
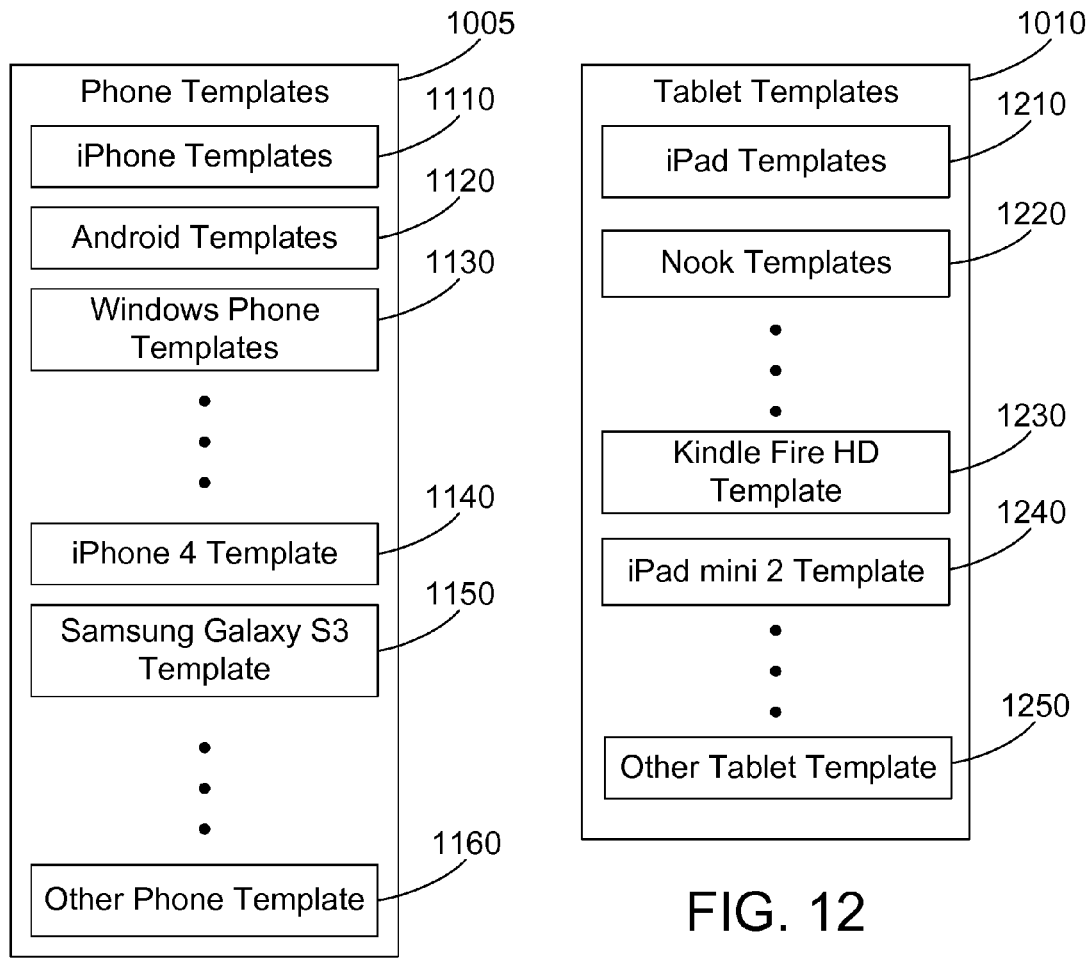
FIG. 11 is a block diagram showing examples of phone templates.
FIG. 12 is a block diagram showing examples of tablet templates.

The device-specific templates 154 provide platform-dependent templates. Thus, the user data, user licensed content, and user settings represented in a device-specific template includes specific items on a specific device or device type. The device-specific templates 154 may also include mapping information to map settings in a physical device to settings in a universal template. FIGS. 11-21 are related to device specific templates 154. Referring to FIG. 11, phone templates 1005 may include iPhone templates 1110, Android templates 1120 and Windows phone templates 1130, which represent different phone types. Phone templates 1005 may also include templates for a specific phone, such as iPhone 4 template 1140 and Samsung Galaxy S3 template 1150, as well as one or more other phone templates 1160 that may be for a phone type or for a specific phone.

Tablet templates 1010 are shown in FIG. 12 to include iPad templates 1210 and Nook templates 1220, which represent different tablet platforms. Tablet templates 1010 may also include templates for a specific tablet, such as a Kindle Fire HD template 1230 and an iPad mini 2 template 1240, as well as one or more other tablet templates 1250 that may be for a tablet type or for a specific tablet.

Laptop templates 1015 are shown in FIG. 13 to include Lenovo laptop templates 1310 and MacBook templates 1320, which represent different laptop computer types. Laptop templates 1015 may also include templates for a specific laptop, such as a Samsung Chromebook template 1330 and an HP Envy template 1340, as well as one or more other laptop templates 1350 that may be for a laptop type or for a specific laptop.

Desktop templates 1020 are shown in FIG. 14 to include HP desktop templates 1410 and Dell desktop templates 1420, which represent different laptop computer types. Desktop templates 1020 may also include templates for a specific desktop computer, such as an HP Pavilion PS-2355 desktop template 1430 and an Asus M11BB-B05 desktop template 1440, as well as one or more other desktop templates 1450 that may be for a desktop type or for a specific desktop computer.

Figures 15, 16:
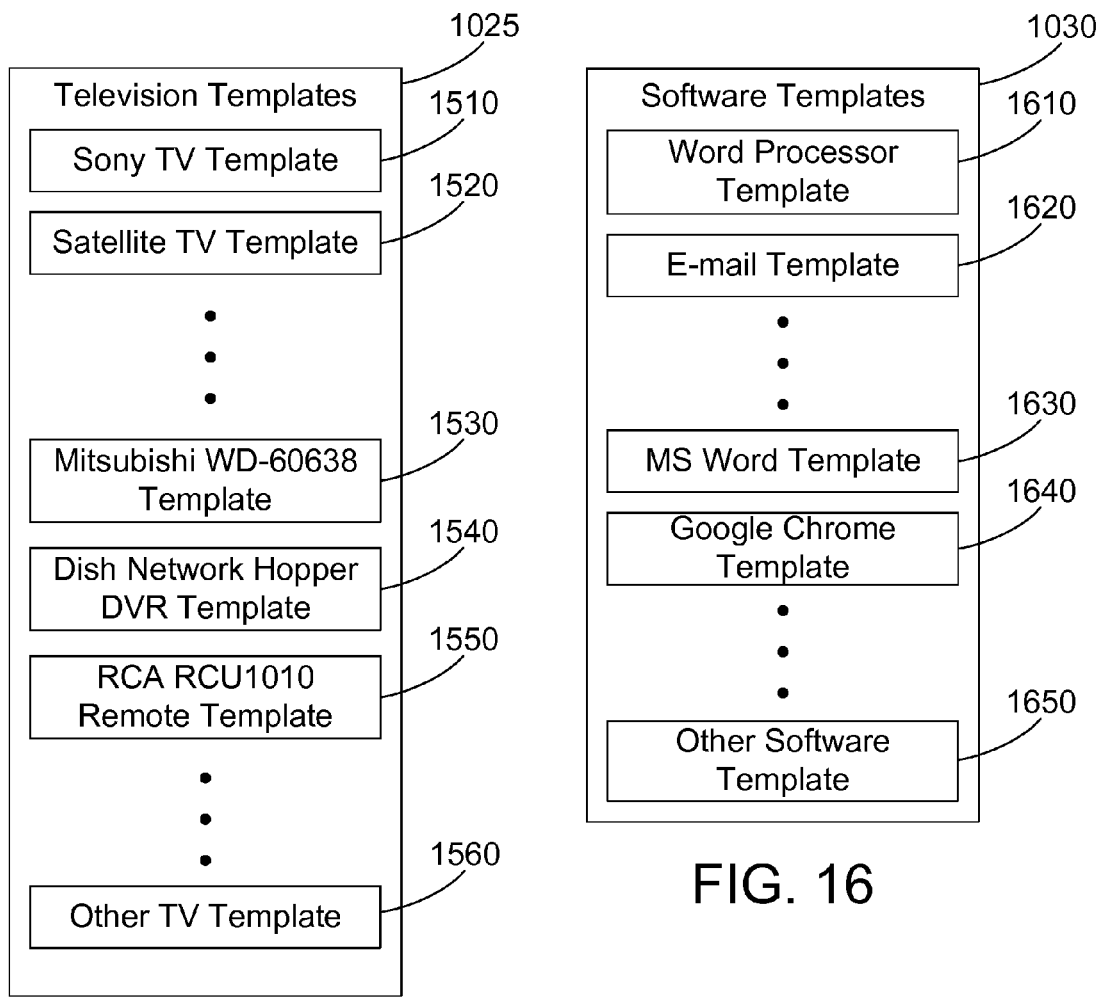
FIG. 15 is a block diagram showing examples of television templates.
FIG. 16 is a block diagram showing examples of software templates.

Television templates 1025 are shown in FIG. 15 to include a Sony TV template 1510 and a satellite TV template 1520, which represent different types of television devices. Television templates 1025 may also include templates for a specific television device, such as a Mitsubishi WD-60638 template 1530, a Dish Network Hopper DVR template 1540, and an RCA RCU1010 remote template 1540, as well as one or more other television device templates 1560 that may be for a television device type or for a specific television-related device.

Software templates 1030 are shown in FIG. 16 to include a word processor template 1610 and an e-mail template 1620, which represent different types of software. Software templates 1030 may also include templates for specific software, such as a Microsoft Word template 1630 and a Google Chrome template 1640, as well as one or more other software templates 1650 that may be for a type of software or for specific software.

Figure 17:
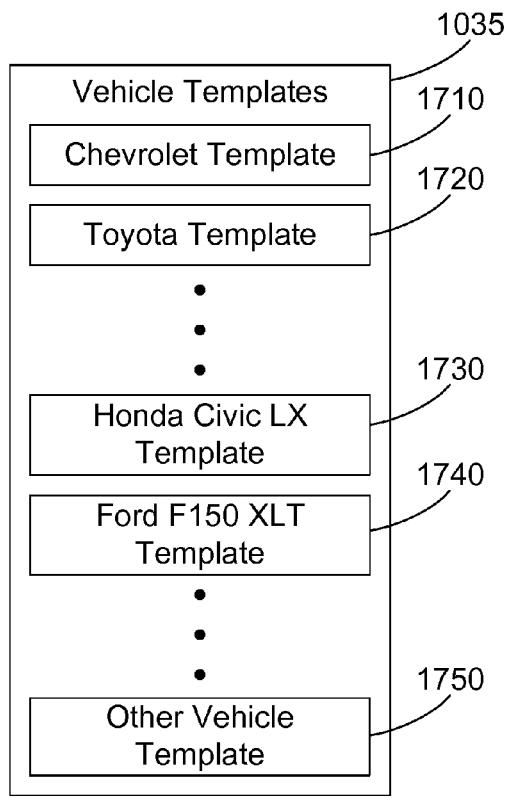
FIG. 17 is a block diagram showing examples of vehicle templates.

Vehicle templates 1035 are shown in FIG. 17 to include a Chevrolet template 1710 and a Toyota template 1720, which represent different types of vehicles. Vehicle templates 1035 may also include templates for specific vehicles, such as a Honda Civic LX template 1730 or a Ford F150 XLT template 1740, as well as one or more other vehicle templates 1750 that may be for a type of vehicle or for a specific vehicle. Note while the only vehicles shown in FIG. 17 are cars and a small truck, the vehicle templates 1035 could include templates for any type of vehicle, including cars, trucks, boats, large semi trucks, planes, and other vehicles.

Figure 18:
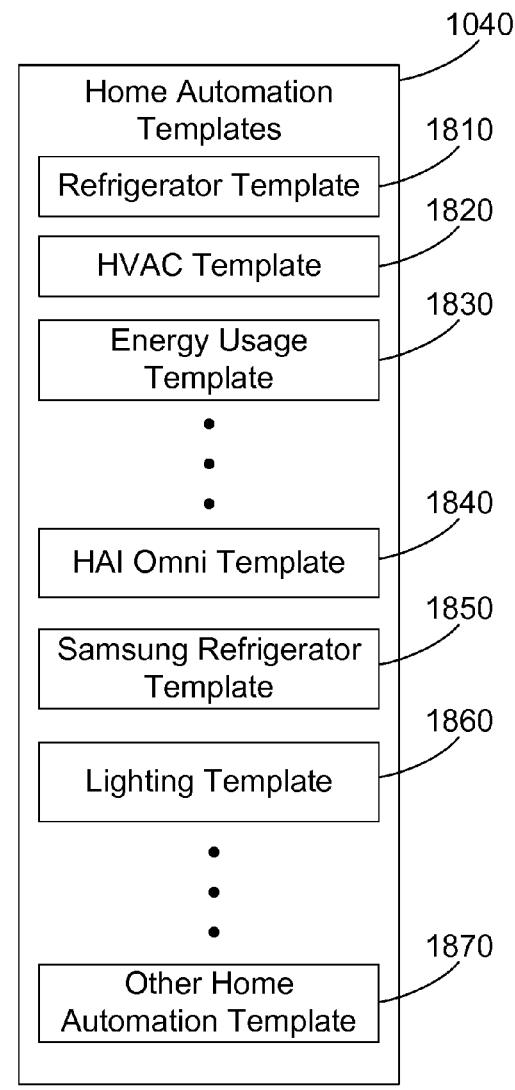
FIG. 18 is a block diagram showing examples of home automation templates.

Home automation templates 1040 are shown in FIG. 18 to include a refrigerator template 1810, an HVAC template 1820, and an energy usage template 1830, which represent different things that may be controlled by a home automation system. Home automation templates 1040 may also include templates for specific home automation systems, such as Home Automation Inc. (HAI) Omni template 1840, Samsung refrigerator template 1850, lighting template 1860, as well as one or more other home automation templates 1870 that may be for a type of home automation controller or type of item controlled by a home automation controller or for a specific home automation controller or item controlled by a home automation controller.

Figure 19:
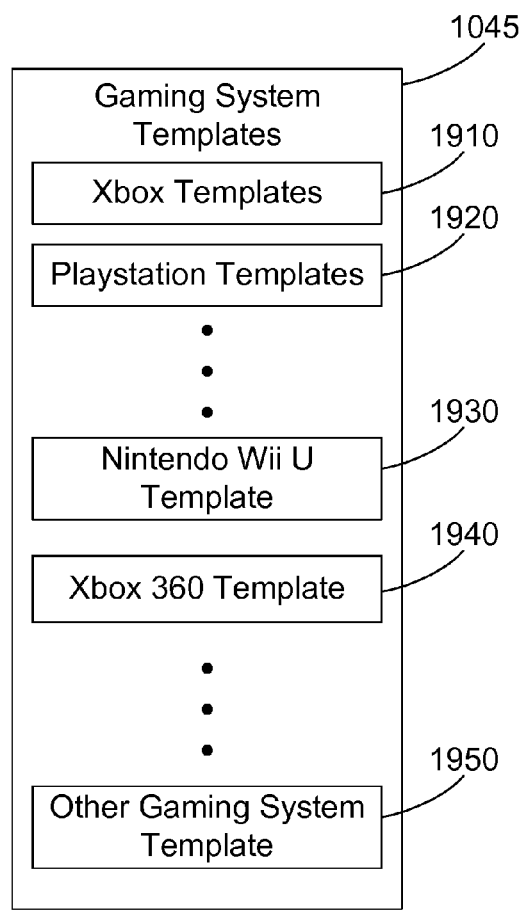
FIG. 19 is a block diagram showing examples of gaming system templates.

Gaming system templates 1045 are shown in FIG. 19 to include Xbox templates 1910 and Playstation templates, which represent different types of gaming systems. Gaming templates 1045 may also include templates for specific gaming systems, such as Nintendo Wii U template 1930 and Xbox 360 template 1940, as well as one or more other gaming system templates 1950 that may be for a type of gaming system or for a specific gaming system.

Figure 20:
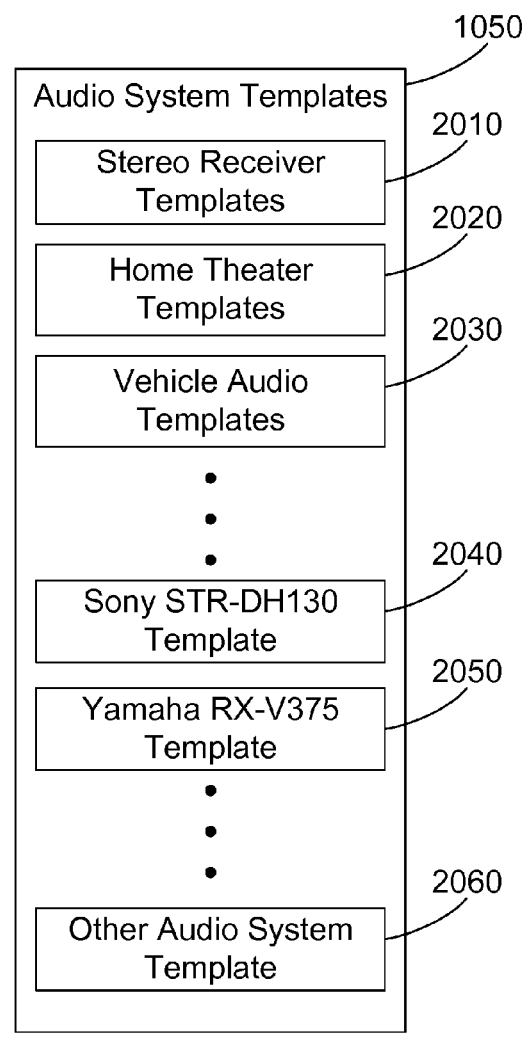
FIG. 20 is a block diagram showing examples of audio system templates.

Audio system templates 1050 are shown in FIG. 20 to include stereo receiver templates 2010, home theater templates 2020, and vehicle audio templates 2030, which represent different types of audio systems. Audio system templates 1050 may also include templates for specific audio systems, such as Sony STR-DH130 template 2040 and Yamaha RX-V375 template 2050, as well as one or more other audio system templates 2060 that may be for a type of audio system or for a specific audio system.

Figure 21:
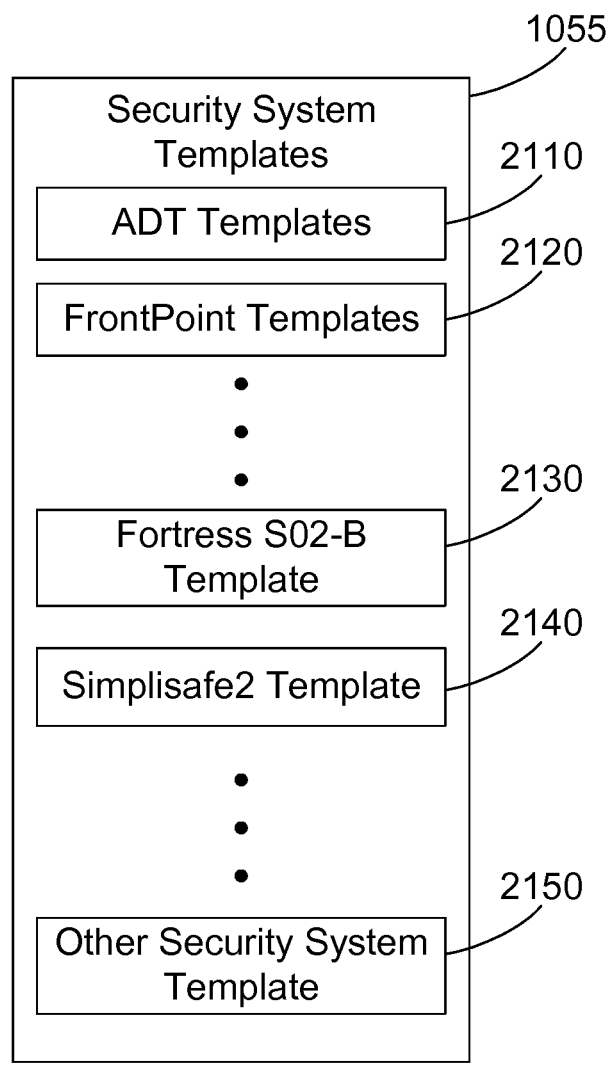
FIG. 21 is a block diagram showing examples of security system templates.

Security system templates 1055 are shown in FIG. 21 to include ADT templates 2110 and FrontPoint templates 2120, which represent different types of security systems from different manufacturers. Security system templates 1055 may also include templates for specific security systems, such as a Fortress S02-B template 2130 and a Simplisafe2 template 2140, as well as one or more other security system templates 2150 that may be for a type of security system or for a specific audio system.

While the templates disclosed herein may be of any suitable format, it is expected that industry experts will have to spend time brainstorming and meeting to arrive at an industry standard. Thus, the automotive industry may generate an industry-standard template for cars, while the personal computer industry may generate a very different industry-standard template for desktop computers. Generating and publishing standard templates will greatly accelerate the acceptance of the U-Me system.

The device-specific templates shown in FIGS. 10-21 could be provided by any suitable entity. For example, the U-Me system may provide some of the device-specific templates. However, some device-specific templates will preferably be provided by manufacturers of devices. As discussed below, the U-Me system includes the capability of device manufacturers to become "U-Me Certified", which means their devices have been designed and certified to appropriately interact with the U-Me system. Part of the U-Me certification process for a device manufacturer could be for the manufacturer to provide a universal template for each category of devices the manufacturer produces, a device-specific template for each category of devices the manufacturer produces, as well as a device-specific template for each specific device the manufacturer sells.

Figure 22:
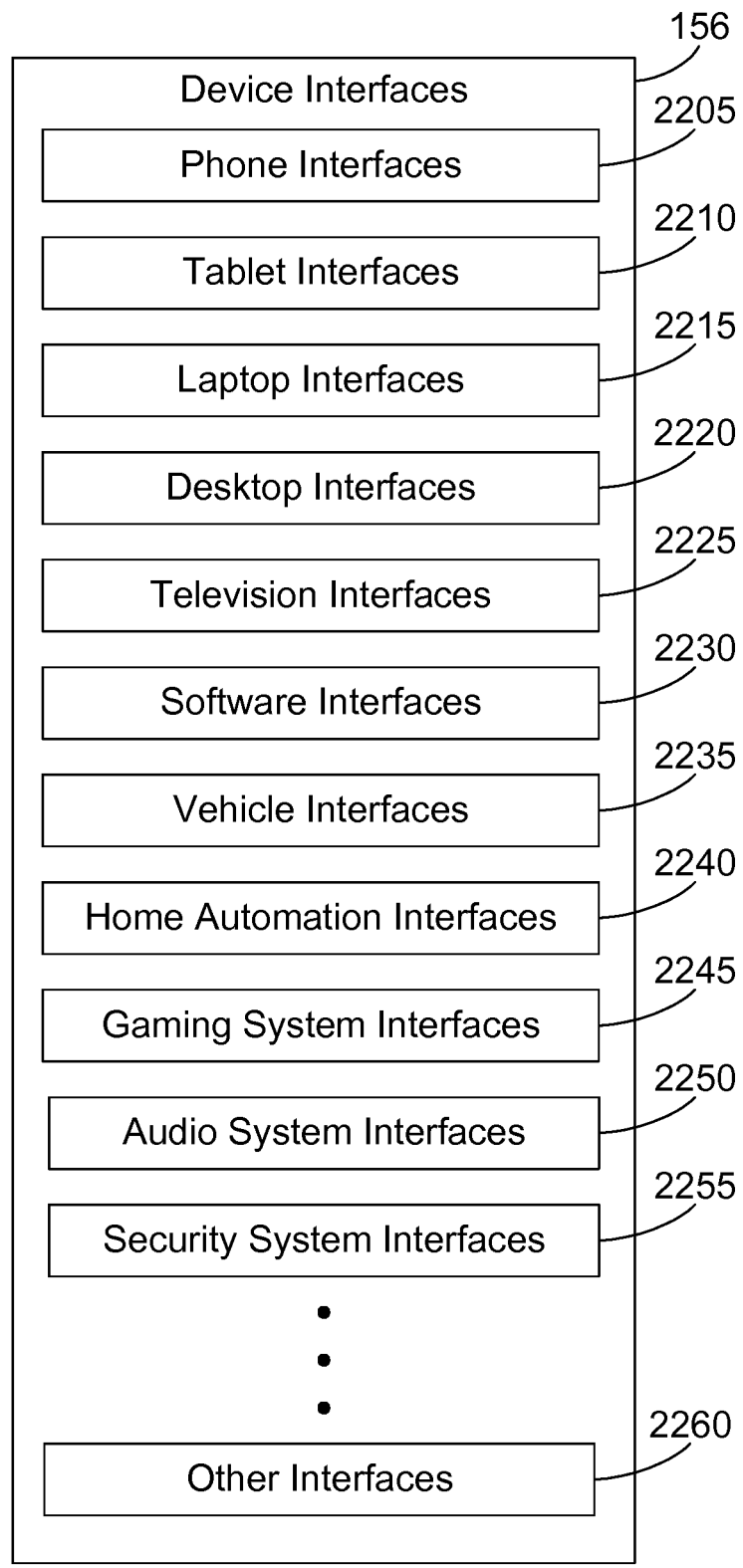
FIG. 22 is a block diagram showing examples of device interfaces.

Referring to FIG. 22, device interfaces 156 preferably include phone interfaces 2205, tablet interfaces 2210, laptop interfaces 2215, desktop interfaces 2220, television interfaces 2225, software interfaces 2230, vehicle interfaces 2235, home automation interfaces 2240, gaming system interfaces 2245, audio system interfaces 2250, security system interfaces 2255, and other interfaces 2260. The device interfaces shown in FIG. 22 are examples shown for the purpose of illustration. The disclosure and claims herein extend to any suitable device interfaces, including device interfaces for devices known today as well as device interfaces for devices developed in the future.

Each device interface provides the logic and intelligence to interact with a specific type of device or with a specific device. Thus, phone interfaces 2205 could include an iPhone interface and an Android interface. In addition, phone interfaces 2205 could include different interfaces for the same type of device. Thus, phone interfaces 2205 could include separate phone interfaces for an iPhone 4 and an iPhone 5.

In the alternative, phone interfaces 2205 could be combined into a single phone interface that has the logic and intelligence to communicate with any phone. In the most preferred implementation, a device interface is provided for each specific device that will interact with the U-Me system. This could be a requirement for a device to become U-Me certified, that the manufacturer of the device provide the device interface that meets U-Me specifications.

Figure 23:
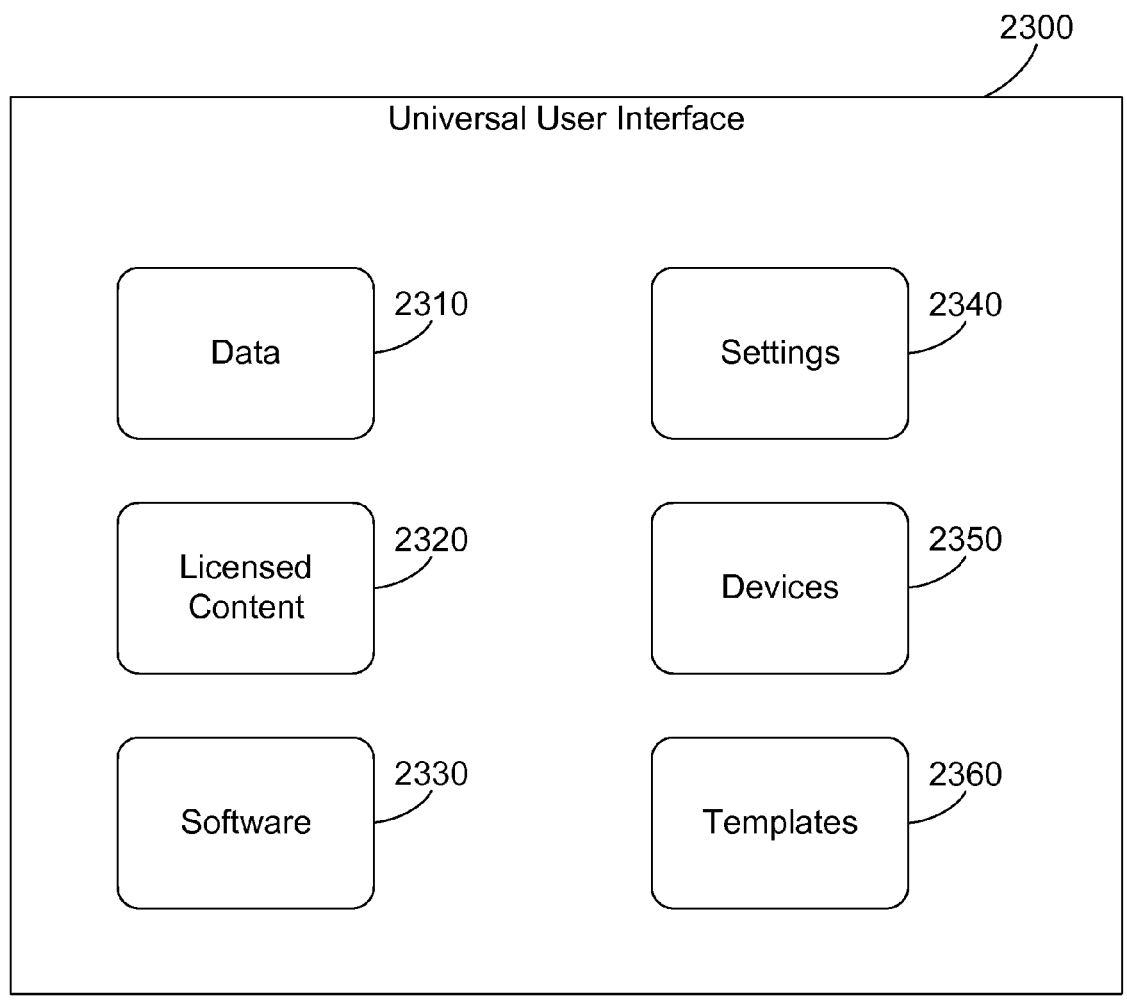
FIG. 23 is a block diagram of a universal user interface.

The U-Me system preferably includes a universal user interface 142 shown in FIG. 5. The universal user interface 2300 shown in FIG. 23 is one suitable example of a specific implementation for the universal user interface 142 shown in FIG. 5. The universal user interface 2300 in FIG. 23 includes several icons the user may select to access various features in the U-Me system. The icons shown in FIG. 23 include a data icon 2310, a licensed content icon 2320, a software icon 2330, a settings icon 2340, a devices icon 2350, and a templates icon 2360. Selecting the data icon 2310 gives the user access to the user data 120 stored in the user's U-Me account, including the types of data shown in FIG. 6. One way for the user to access the user data 120 is via a data search engine. Selecting the licensed content icon 2320 gives the user access to any and all of the user's licensed content 130, including the categories of licensed content shown in FIG. 7. Selecting the software icon 2330 gives the user access to software available in the user's U-Me account. While software is technically a category of licensed content (see 735 in FIG. 7), a separate icon 2330 is provided in the universal user interface 2300 in FIG. 23 because most users would not mentally know to select the licensed content icon 2320 to run software. Selecting the software icon 2330 results in a display of the various software applications available in the user's U-Me account. The user may then select one of the software applications to run. The display of software icons could be considered a "virtual desktop" that is available anywhere via a browser or other suitable interface.

Selecting the settings icon 2340 gives the user access to any and all of the user settings 140, including the categories of settings shown in FIG. 8. Selecting the devices icon 2350 gives the user access to virtual devices, which are discussed in more detail below, where the virtual devices correspond to a physical device used by the user. The user will also have access to the device interfaces 156, including the device interfaces shown in FIG. 22. Accessing devices via the device interfaces allows the user to have remote control via the universal user interface over different physical devices. Selecting the templates icon 2360 gives the user access to the templates in the user's U-Me account, including: universal templates, including the universal templates shown in FIG. 9; and device-specific templates, including the device-specific templates shown in FIGS. 10-21. The devices icon 2350 and the templates icon 2360 provide access to information in the user's U-Me account pertaining to devices and templates, which can be part of the settings in the user's U-Me account. While the Devices icon 2350 and Templates icon 2360 could be displayed as a result of a user selecting the Setting icon 2240, these icons 2350 and 2360 that are separate from the settings icon 2340 are provided in FIG. 23 to make using the universal user interface 2300 more intuitive for the user.

The universal user interface gives the user great flexibility in accessing a user's U-Me account. In the most preferred implementation, the universal user interface is browser-based, which means it can be accessed on any device that has a web browser. Of course, other configurations for the universal user interface are also possible, and are within the scope of the disclosure and claims herein. For example, a user on vacation in a foreign country can go into an Internet café, invoke the login page for the U-Me system, log in, and select an icon that causes the universal user interface (e.g., 2300 in FIG. 23) to be displayed. The user then has access to any and all information stored in the user's U-Me account.

Because the universal user interface allows a user to access the user's U-Me account on any device, the universal user interface also provides a way for a user to change settings on the user's devices. Because the user's U-Me account includes virtual devices that mirror the configuration of their physical device counterparts, the user could use a laptop or desktop computer to define the settings for the user's phone. This can be a significant advantage, particularly for those who don't see well or who are not dexterous enough to use the tiny keypads on a phone. A simple example will illustrate. Let's assume a U-Me user wants to assign a specific ringtone to her husband's contact info in her phone. The user could sit down at a desktop computer, access the universal user interface 2300, select the Devices icon 2350, select a Phone icon, which then gives the user access to all of the settings in the phone. The user can then navigate a menu displayed on a desktop computer system using a mouse and full-sized keyboard to change settings on the phone instead of touching tiny links and typing on a tiny keyboard provided by the phone. The user could assign the ringtone to her husband's contact info in the settings in the virtual device in the U-Me account that corresponds to her phone. Once she makes the change in the virtual phone settings in the U-Me account, this change will be automatically propagated to her phone. The universal user interface may thus provide access to the user to set or change the settings for all of the user's physical devices.

The universal user interface 142 can include any suitable interface type. In fact, the universal user interface 142 can provide different levels of interfaces depending on preferences set by the user. Thus, the universal user interface may provide simple, intermediate, and power interfaces that vary in how the information is presented to the user depending on the user's preferences, which could reflect the technical prowess and capability of the user. Those who are the least comfortable with technology could select a simple interface, which could provide wizards and lots of help context to help a user accomplish a desired task. Those more comfortable with technology could select the intermediate interface, which provides fewer wizards and less help, but allows a user to more directly interact with and control the U-Me system. And those who are very technically-oriented can select the power interface, which provides few wizards or help, but allows the user to directly interact with and control many aspects of the U-Me system in a powerful way.

Figure 24:
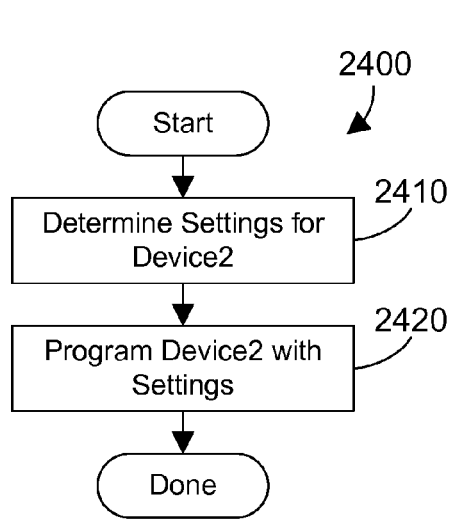
FIG. 24 is a flow diagram of a method for programming a physical device with settings from the U-Me system.
Figure 25:
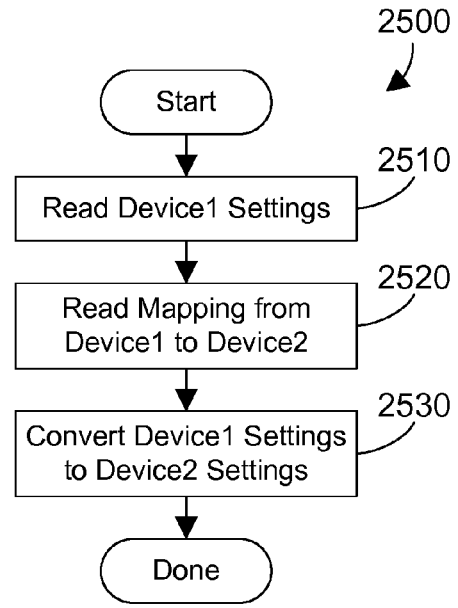
FIG. 25 is a flow diagram of a first suitable method for performing step 2410 in FIG. 24 using a mapping between two physical devices.
Figure 26:
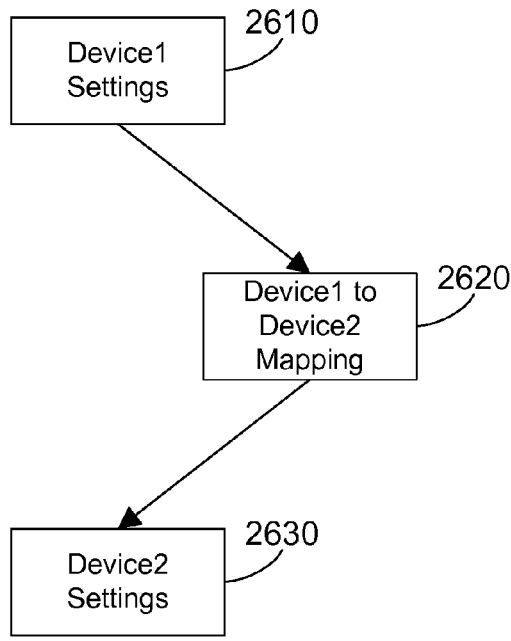
FIG. 26 is a block diagram showing the generation of settings for Device2 from settings for Device 1 as shown in the flow diagram in FIG. 25.

There are many different ways to program a device using the information in the user's U-Me account. Referring to FIG. 24, a method 2400 for programming a device called Device2 begins by determining settings for Device2 (step 2410), then programming the device with those settings (step 2420). There are different ways to determine the settings for Device2 in step 2410. Referring to FIG. 25, method 2500 shows one suitable implementation for step 2410 in FIG. 24. Settings for a device called Device1 are read (step 2510). A mapping from Device1 to Device2 is then read (step 2520). The settings for Device1 are then converted to the settings for Device2 (step 2530). This is shown graphically in FIG. 26, where the Device1 settings 2610 are converted using the Device1 to Device2 mapping 2620 to Device2 settings 2630. This first example in FIGS. 25 and 26 show how to program a device by converting settings from one device to settings for a different device. For example, let's assume a user has been using an iPhone 4, then decides to change to a Samsung Galaxy S4 phone. Assuming there are device-specific templates 154 for both phones, the conversion mechanism 160 in FIG. 5 can convert the settings on the iPhone 4 to settings on the Samsung Galaxy S4, provided there is a mapping in the phone templates between the device-specific settings of the two devices. The example in FIGS. 25 and 26 shows how to program a device by converting from settings of a different device.

Figure 27:
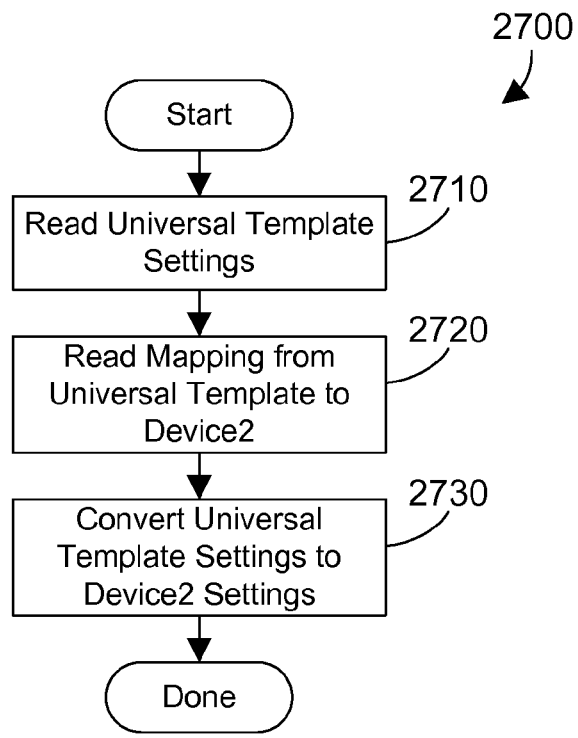
FIG. 27 is a flow diagram of a second suitable method for performing step 2410 in FIG. 24 using a universal template.
Figure 28:
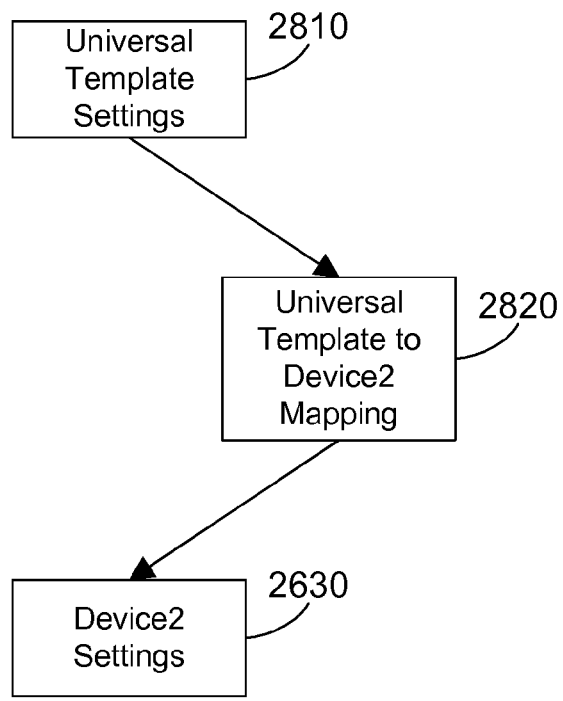
FIG. 28 is a block diagram showing the generation of settings for Device2 from a universal template as shown in the flow diagram in FIG. 27.

A second suitable implementation for step 2410 in FIG. 24 is shown in FIGS. 27 and 28. In this implementation, Device2 is programmed from settings stored in the Universal Template corresponding to Device2. The universal template settings are read (step 2710). A mapping from the universal template to Device 2 is read (step 2720). The conversion mechanism then converts the settings from the universal template to the settings for Device2 (step 2730). This is shown graphically in FIG. 28, where universal template settings 2810 are converted using the universal template to Device2 mapping 2820 to generate Device2 settings 2630. This second implementation in FIGS. 27 and 28 vary from the first implementation in steps 25 and 26 because the conversion of settings is between the universal template settings to the Device2 settings, not from the settings of another device (such as Device1).

Figure 29:
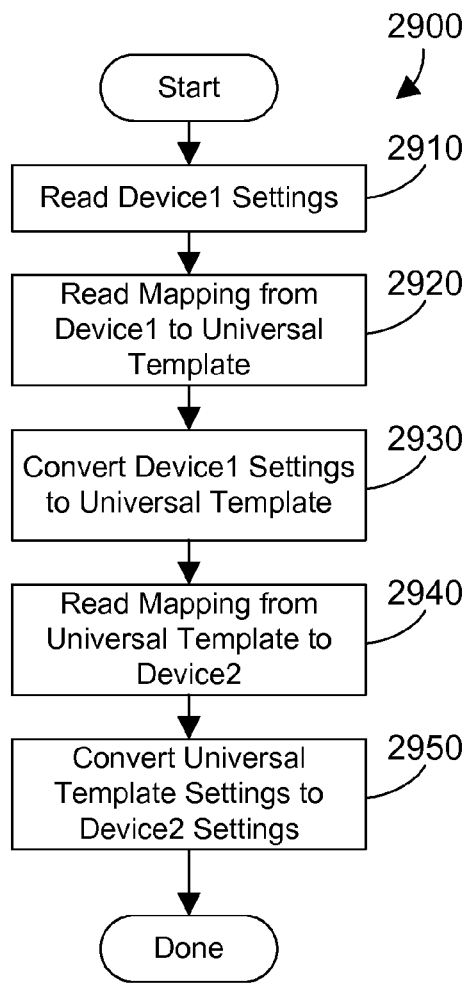
FIG. 29 is a flow diagram of a third suitable method for performing step 2410 in FIG. 24 using settings from a first device and a universal template.
Figure 30:
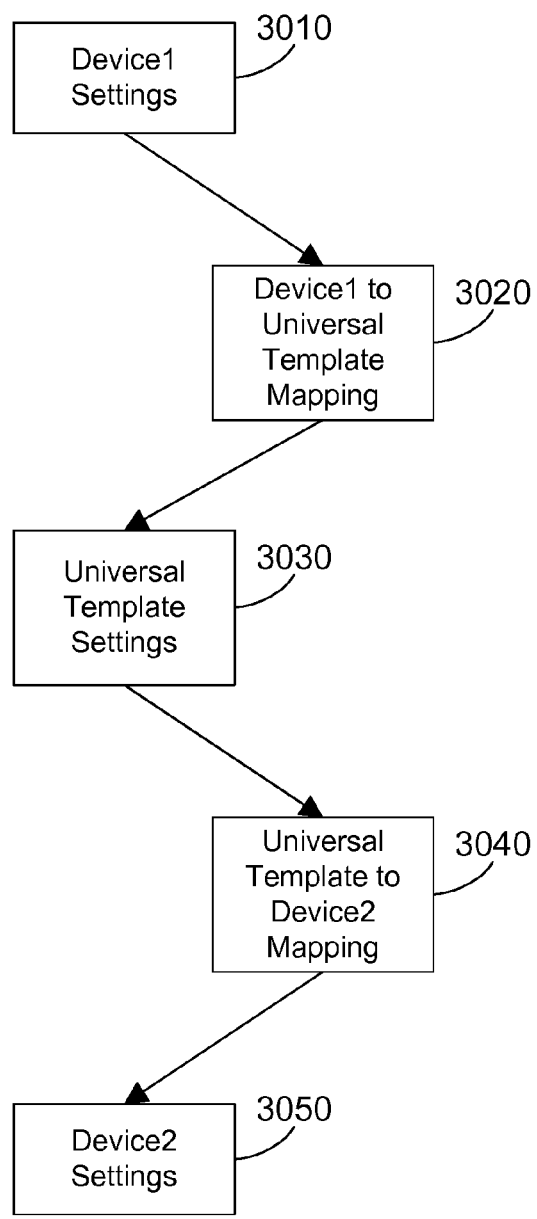
FIG. 30 is a block diagram showing the generation of settings for Device2 as shown in the flow diagram in FIG. 29.

A third suitable implementation for step 2410 in FIG. 24 is shown in FIGS. 29 and 30. Device1 settings are read (step 2910). A mapping from Device1 to the universal template is also read (step 2920). The Device1 settings are then converted to the universal template settings (step 2930). A mapping from the universal template to Device2 is then read (step 2940). The universal template settings are then converted to Device 2 settings (step 2950). This is shown graphically in FIG. 30, where the Device1 settings are converted using the Device1 to universal template mapping 3020 to universal template settings 3030, which are then converted using the universal template to Device2 mapping 3040 to Device2 settings 3050. This third implementation converts settings between two devices, similar to the first implementation shown in FIGS. 25 and 26, but this is not a direct mapping between two devices, but is rather a mapping to and from universal template settings.

Figure 33:
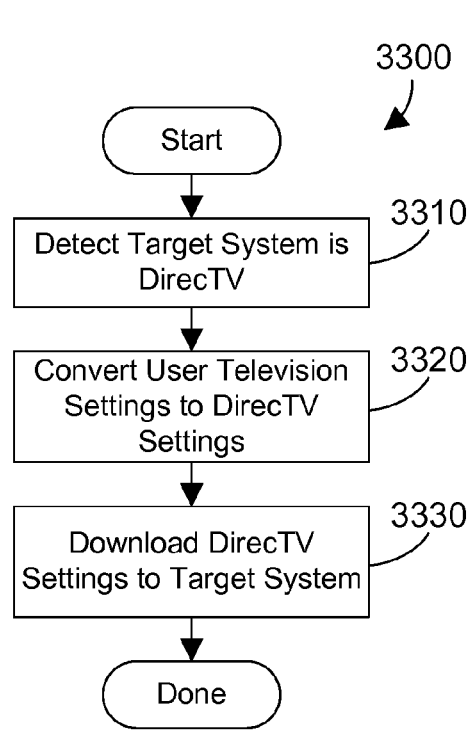
FIG. 33 is a flow diagram of a method for converting channel numbers for Dish Network to channel numbers for DirecTV.

We now consider one specific usage of the U-Me system with regards to television equipment with respect to FIGS. 31-43. We assume a user's television settings are store in the user's U-Me account. Examples of suitable television settings 835 are shown in FIG. 32 to include one or more favorite channels list 3210, shows set to record 3220, blocked channels 3230, parental controls 3240, channel numbers for stations 3250, and an unlock password 3260. These are all settings the user can define, for example, in a DVR for Dish Network. For this specific example, we assume the user has Dish Network at the user's home, and programs the Dish Network DVR with some or all of the user television settings 835 shown in FIG. 32. We now assume the user travels to a new location during a vacation, such as a hotel room, a resort, a relative's house, etc., and we further assume the new location has DirecTV. Referring to FIG. 33, method 3300 begins by detecting the target system (at the new location) is a DirecTV system (step 3310). The user's Dish Network television settings are converted to equivalent or similar DirecTV settings in the user's U-Me account (step 3320). The converted DirecTV settings from the user's U-Me account are then downloaded to the DirecTV target system (e.g., DVR) at the new location (step 3330). The result is the user's Dish Network television settings are now available on the DirecTV DVR. One part of the conversion in step 3320 is converting the channel numbers from Dish Network to the equivalent channel numbers in DirecTV. A sample mapping for ten channels is shown at 3100 in FIG. 31. Note the channels ABC, NBC, CBS and Fox in the mapping 3100 show "local" instead of a number, because the channel numbers will vary from one geographic region to the next. The indication of "local" in the channel mapping will indicate a need to determine the location of the target system, and determine the appropriate mapping to the target system using the channel numbers that are specific to the geographic region where the target system is located. This is a task easily accomplished by the U-Me system.

Note that known DVRs for Dish Network and DirecTV do not allow downloading settings as discussed above with respect to method 3300 in FIG. 33. For television providers to work in conjunction with the U-Me system, each provider's DVR will need to be "U-Me Certified", meaning the DVR includes logic and intelligence that allows the DVR to interact with the U-Me system. This certification process will also preferably provide a device-specific template for each DVR, along with information that allows mapping the settings from one provider to another provider. In the most preferred implementation, a universal template for a DVR could be defined with required fields, and each device-specific template for each DVR will have to have the required fields specified in the universal DVR template.

Figure 34:
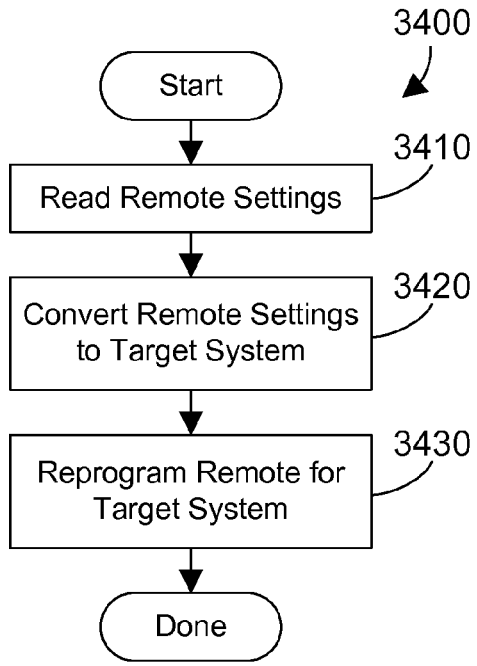
FIG. 34 is a flow diagram of a method for reprogramming a remote control for a television.
Figure 35:
FIG. 35 is an example of a display of a television remote control.
Figure 36:
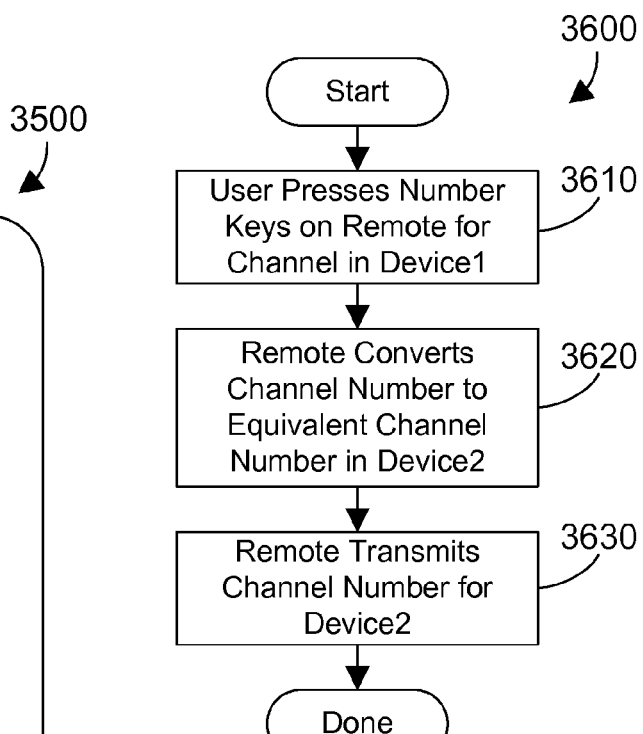
FIG. 36 is a flow diagram of a method for converting a channel number entered by a user to a corresponding different channel number for a target system.

Changing television settings in the new location would not be very helpful unless the user has a remote control that can accommodate the change. We assume for this example a user has a remote control with a screen that displays channel icons, such as shown in FIG. 35. Such remote controls, such as the Pronto touch-screen remote control and the RCA RCU1010 remote control, allow displaying a channel icon. Method 3400 in FIG. 34 can be used to reprogram a remote control to accommodate the change of location in the example above. This example also assumes the remote control is "U-Me Certified", meaning the remote control includes logic and intelligence that allows the remote control to interact with the U-Me system. The settings for the remote control are read (step 3410). Thus, the mapping of channel icons to channel numbers is determined in step 3410. The settings are converted to equivalent or similar settings for the target system (step 3420). This means the channel numbers of the displayed icons in display 3500 in FIG. 35 for Dish Network are converted to the equivalent channel numbers using the mapping 3100 in FIG. 31. The conversion of settings is preferably performed by the conversion mechanism 160 shown in FIG. 5. The remote control is then reprogrammed for the target system (step 3430). This means the channel numbers that are sent by the remote control are now the channel numbers for DirecTV, not Dish Network. Thus, when the user is home and presses the Fox News icon, the remote control sends channel 205 to the Dish Network DVR. But after the remote control has been reprogrammed for the target system at the new location as shown in FIG. 34, when the user presses the Fox News icon, the remote control will now send channel 360 to the DirecTV DVR. This reprogramming thus allows a user to use a remote control with icon-based channels by reprogramming the underlying channel numbers that are sent by the remote control when an icon is pressed. The user is thus able to travel with the user's home remote control, and have the remote control be automatically reprogrammed to accommodate the television system at the new location, assuming the television system at the new location is U-Me compliant.

In addition to reprogramming the remote to transmit different channel numbers when an icon is pressed, the remote can also be reprogrammed to transmit different channel numbers than channel number pressed by the user. This is shown in method 3600 in FIG. 36. A user uses the numeric keypad on the remote control to key in a channel number for Device1 (step 3610). The remote automatically converts the channel number entered by the user to the equivalent channel number in the target system (step 3620). The remote then transmits the channel number for Device2 (step 3630). For the simple example given above, with Dish Network at the user's home and DirecTV at the new location, when the user presses channel 138 on the remote control keypad (step 3610), the remote control keypad will detect the number and convert the number 138 for TNT in Dish Network to number 245 for TNT in DirecTV (as shown in FIG. 31) (step 3620). The remote control then transmits channel number 245 to the DirecTV DVR (step 3630). In this manner the user need not learn the new channel numbers at the new location, but can instead use the old channel numbers from home to access the same television channels on the system at the new location.

Note there are apps for Android smart phones that allow turning the phone into a touch-screen remote control for certain types of TVs. One such app is Smart VE Remote Control that can serve as a remote control for certain Samsung televisions. Because known Android smart phones typically do not have an infrared (IR) transmitter that is commonly used in many remote controls, a smart phone cannot be used in the same manner as conventional remote controls. Instead, these apps send signals via the Wi-Fi network, and these signals are transmitted via the Wi-Fi network to the television, which is Wi-Fi enabled. As televisions that are Wi-Fi enabled that can be controlled by a Wi-Fi remote (such as a smart phone with the appropriate app) become more popular, the methods discussed above with respect to FIGS. 31-36 could be carried out by reprogramming a smart phone app. This will be incredibly convenient because the user will always travel with the user's smart phone, which means the user will always have a remote control that can be reprogrammed by the U-Me system to work on a target system at a new location. Of course, this scenario is many years into the future after such televisions are widely available and after manufacturers of televisions, television equipment, and remote controls all become U-Me certified.

Figure 37:
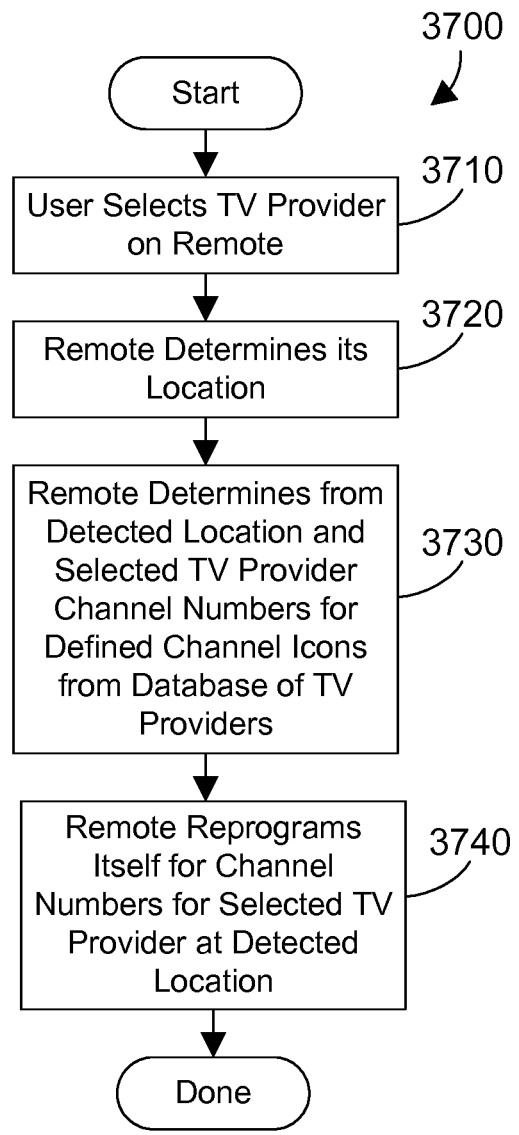
FIG. 37 is a flow diagram of a method for reprogramming a television remote control according to a target system at a location.

Method 3700 in FIG. 37 shows another method for reprogramming a remote control. A user selects a TV provider on the remote control (step 3710). The remote control determines its location (step 3720). The remote determines from the detected location and from the selected TV provider channel numbers for defined channel icons from a database of TV providers (step 3730). The remote then reprograms itself for channel numbers for the selected TV provider at the detected location (step 3740). A simple example will illustrate. Let's assume the same scenario discussed in detail above, where a user has Dish Network at home and travels to a location that has DirecTV. The user could press a button, icon, or selection from a drop-down list on the remote control that selects DirecTV in step 3710. The remote control could detect its location in step 3720 in any suitable way, including an internal GPS device, a wireless network interface that detects an Internet Protocol (IP) address and determines a geographic location for that IP address, or in any other suitable way. The remote then consults a database of channel numbers for various TV providers at that geographic location. In one embodiment, the database will be stored in the remote control itself. In another embodiment, the database will be stored external to the remote, such as at a website, and could be accessed by the remote control via a Wi-Fi connection. Once the remote control determines the channel numbers that correspond to DirecTV at the geographic location, the remote control reprograms itself for those channel numbers (step 3740). Note that method 3700 supports changing the underlying channel numbers for displayed channel icons, similar to that discussed with respect to FIG. 34, as well as dynamically changing channel numbers entered by the user, similar to that discussed above with respect to FIG. 36. The U-Me system provides a very powerful way for a user to use settings the user is accustomed to using at home while interacting with an entirely unfamiliar system at a new location.

Figure 38:
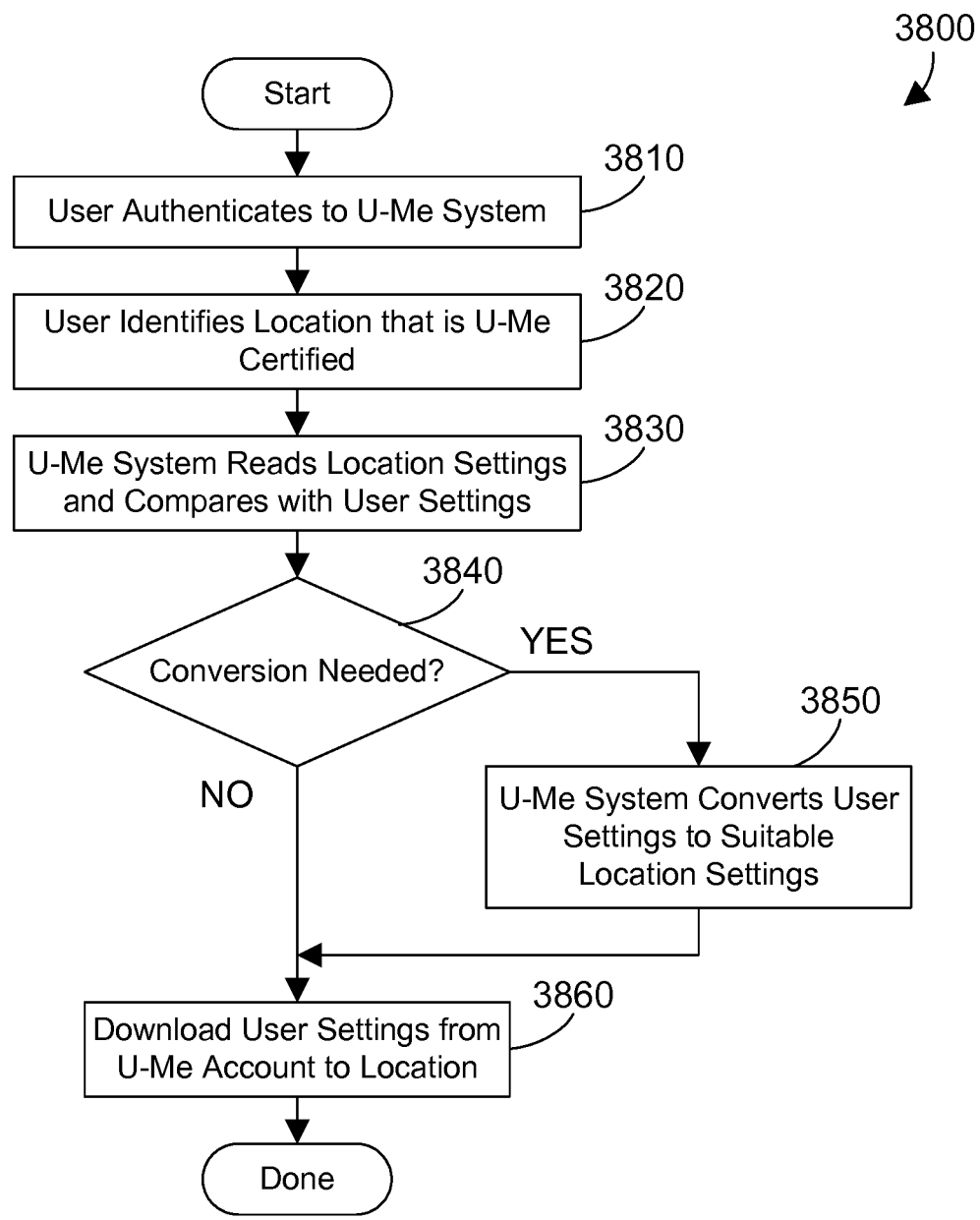
FIG. 38 is a flow diagram of a method for downloading settings from a user's U-Me account to a location.

Referring to FIG. 38, a method 3800 shows how the user may access the user's data and/or licensed content and/or settings that are stored in the user's U-Me account. The user authenticates to the U-Me system (step 3810). The user identifies a location that is U-Me certified (step 3820). The U-Me system reads the location settings and compares the location settings with the user settings (step 3830). When conversion is needed (step 3840=YES), the conversion mechanism in the U-Me system converts the user settings to suitable location settings (step 3850). The conversion of settings is preferably performed by the conversion mechanism 160 shown in FIG. 5. The user settings that correspond to the location are then downloaded to devices at the location (step 3860). When no conversion is needed (step 3840=NO), the user settings in the user's U-Me account can be downloaded to devices at the location (step 3860). Method 3800 could be representative of any suitable location, including a vehicle, a hotel room, a rental condo, etc.

Figure 39:
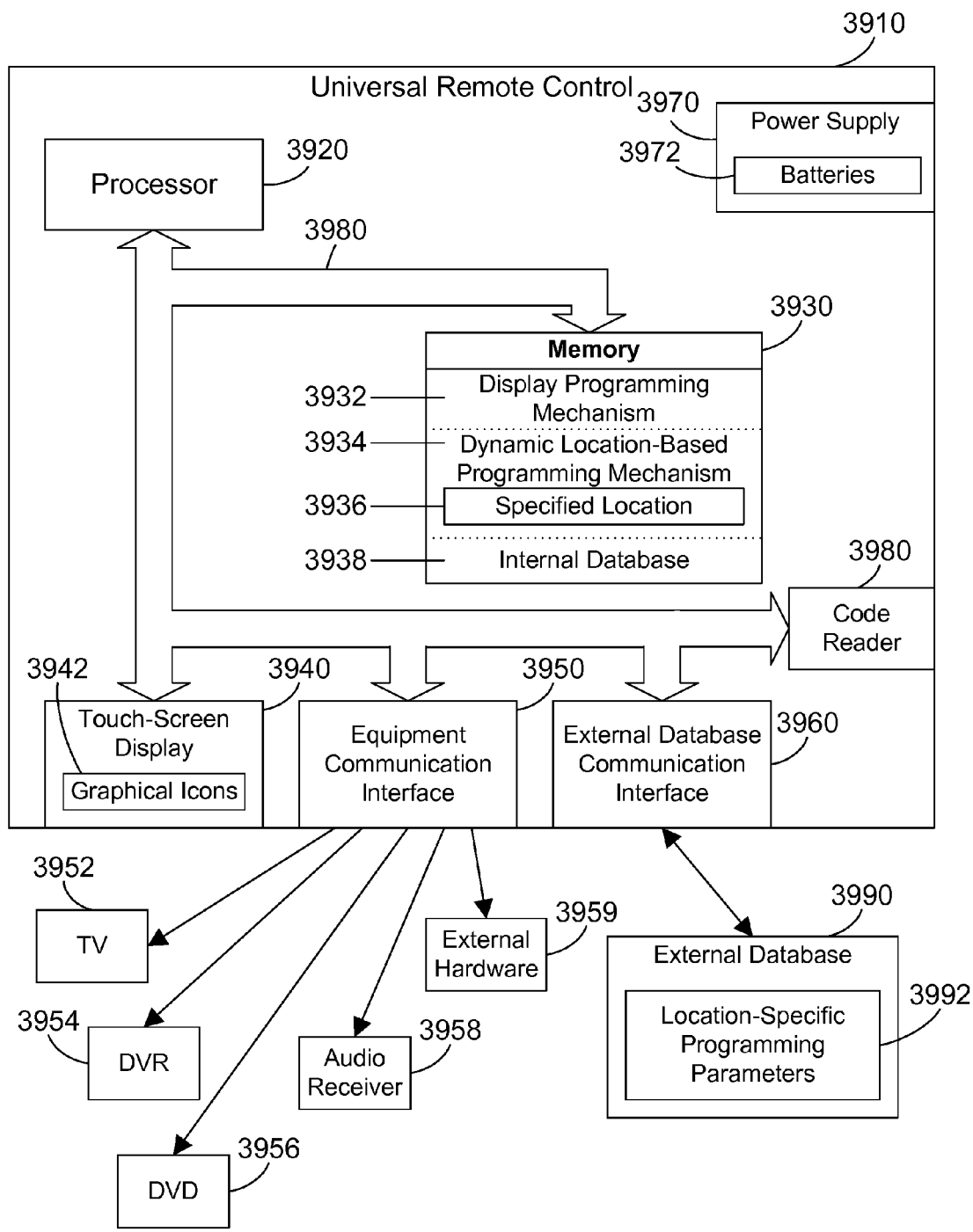
FIG. 39 is a block diagram of a universal remote control that includes a dynamic location-based programming mechanism.

Referring to FIG. 39, a universal remote control 3910 is shown to include a processor 3920 coupled to a memory 3930, a touch-screen display 3940, an equipment communication interface 3950, an external database communication interface 3960, and a code reader 3980 via a system bus 3980. Batteries 3972 preferably provide power to a power supply 3970, which provides power to the various components in the universal remote control 3910. Of course, a different power source than batteries could be used, such as power from a wall-plug DC adapter. Batteries 3972 are preferred so the universal remote control 3910 can be used without a power cord.

Memory 3930 preferably contains a display programming mechanism 3932, a dynamic location-based programming mechanism 3934, and an internal database 3938. The display programming mechanism 3932 allows dynamically programming touch-screen display 3940 so the graphical icons 3942 are programmed to correct channel numbers for a specified location. If any of the channels represented by graphical icons 3942 are not available in the specified location, the display programming mechanism 3932 could delete those graphical icons, or could show those graphical icons "grayed out", meaning they still show up but are not selectable by the user.

The dynamic location-based programming mechanism 3934 functions according to a specified location 3936. The specified location may 3936 can be specified in any suitable way. For example, the user could enter a numeric identifier that identifies the specified location. The user could use the code reader 3980 to read a suitable machine-readable code or identifier, such as text, a QR code, a barcode, or any other machine-readable identifier. The specified location 3936 could be determined from a GPS device internal to the universal remote control 3910. The specified location 3936 could be determined by communicating any suitable location-specific information, such as IP address, to an external database such as 3990, which could return a location based on the IP address. These examples are not limiting, and the disclosure and claims herein expressly extend to any suitable way of determining or defining specified location 3936.

Processor 3920 may be constructed from one or more microprocessors and/or integrated circuits. Processor 3920 executes program instructions stored in memory 3930. Memory 3930 stores programs and data that processor 3920 may access.

Although universal remote control 3910 is shown to contain only a single processor and a single system bus, those skilled in the art will appreciate that a universal remote control as disclosed and claimed herein may have multiple processors and/or multiple buses. In addition, the interfaces that are used preferably each include separate, fully programmed microprocessors that are used to off-load compute-intensive processing from processor 3920. However, those skilled in the art will appreciate that these functions may be performed using I/O adapters as well.

Touch-screen display 3940 includes graphical icons 3942 that can be selected by a user touching the icon on the display 3940. Equipment communication interface 3950 is used to transmit commands to equipment or devices. For the specific example shown in FIG. 39, the equipment communication interface 3950 is shown communicating with a television 3952, a digital video recorder (DVR) 3954, a digital video disk (DVD) player 3956, an audio receiver 3958, and external hardware 3959. These devices are shown as examples of equipment that can be controlled by the universal remote control 3910. The equipment communication interface 3950 can send commands in any suitable format or combination of formats. For example, let's assume the television 3952 is Wi-Fi enabled, which means it can be controlled via commands sent via the Wi-Fi network. Let's further assume the DVR 3954, DVD 3956 and audio receiver 3958 are not Wi-Fi enabled, but are controlled by infrared signals. In this specific scenario, the equipment communication interface 3950 would include a Wi-Fi interface that communicates via a Wi-Fi network with the TV 3952, and an infrared interface that communicates with the DVR 3954, DVD 3956 and audio receiver 3958. Note the equipment communication interface 3950 could also communicate with external hardware 3959, which then communicates with equipment. Thus, for the specific scenario given above, if the universal remote control 3910 is implemented in a smart phone running an app, and the smart phone does not have an infrared transmitter, the equipment interface 3950 could be a Wi-Fi interface that communicates directly with the TV and with external hardware 3959 that includes an infrared transmitter so the commands sent via the Wi-Fi interface to the external hardware 3959 can be converted to corresponding commands on the infrared transmitter. These examples show the equipment communication interface 3950 can include any suitable interface or combination of interfaces to control any suitable equipment or device.

The external database communication interface 3960 provides an interface to an external database 3990 that includes location-specific programming parameters 3992. Any suitable interface 3960 can be used for communicating with any suitable type of external database 3990. For example, the external database communication interface 3960 could be a wireless interface that connects via Wi-Fi to a website that provides the external database 3990. In one specific implementation, the location-specific programming parameters 3992 include all information needed to program the universal remote control 3910 for the specified location 3936. In an alternative implementation, the location-specific parameters 3992 may include location-specific information, such as which devices are at the specified location, while the programming codes for the devices are stored in the internal database 3938. The universal remote control 3910 can thus be programmed automatically to control equipment (devices) at the specified location by the universal remote control interacting with the external database 3990 to determine the location-specific programming parameters 3992 that correspond to the specified location. The universal remote control 3910 is thus more "universally remote" than known universal remote controls, because it can be easily and automatically programmed to suit different locations using location-specific programming parameters. The universal remote control 3910 is thus universal across locations, not just universal in being programmable to control a large number of devices, as is known in the art.

As will be appreciated by one skilled in the art, aspects of the disclosed document processing system may be embodied as a system, method or computer program product. Accordingly, aspects of the document processing system may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the document processing system may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the document processing system may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the document processing system are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figures 40, 41:
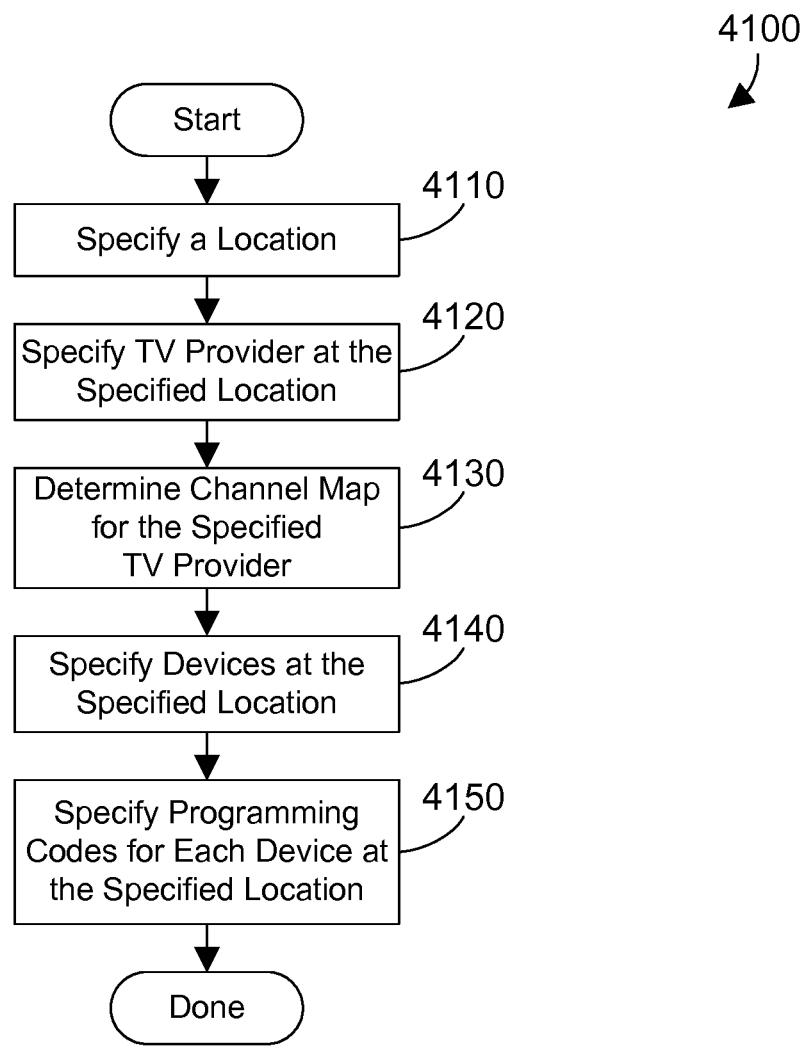
FIG. 40 shows some examples of different types of remote controls.
FIG. 41 is a flow diagram of a method for storing remote control programming parameters for a given location.

As shown in FIG. 40, the universal remote control 3910 shown in FIG. 39 can be implemented in a number of different ways. Examples shown in FIG. 40 include a smart phone with an app; a smart phone with external hardware and an app; a tablet computer with an app; a tablet computer with external hardware and an app; and a dedicated universal remote control. Of course, other implementations are also possible within the scope of the disclosure and claims herein.

Referring to FIG. 41, a method 4100 shows how to setup location-specific programming parameters 3992 in the external database 3990 shown in FIG. 39. A location is specified (step 4110). A TV provider at the specified location is specified (step 4120). A channel map for the specified TV provider is determined (step 4130). Devices at the specified location are specified (step 4140). Devices in step 4140 refers to equipment at the specified location that will be controlled by the universal remote control. Programming codes are then specified for each device at the specified location (step 4150). Note that method 4100 could be repeated for each location specified in the external database 3990. Note also that step 4150 could be optional if the programming codes are included in the internal database 3938 shown in FIG. 39.

Figures 42, 43:
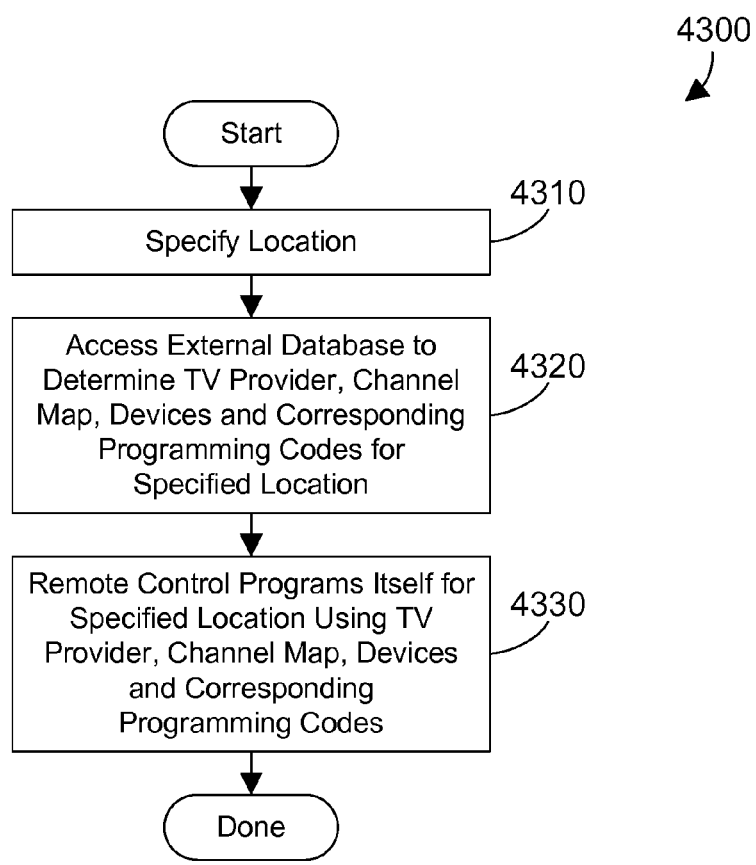
FIG. 42 shows an example of remote control programming parameters for a given location.
FIG. 43 is a flow diagram of a method for a remote control to program itself using programming parameters for a given location stored in an external database.

One example of an entry 4200 in the external database 3990 in FIG. 39 is shown in FIG. 42. Note that entry 4200 could be generated using method 4100 in FIG. 41. Entry 4200 includes a location identifier 124987 that uniquely identifies a location. The entry 4200 specifies the TV provider at that location, which is DirecTV for this location. The channel map is the DirecTV channel map, which will correlate channels provided by DirecTV at the specified location with the corresponding channel numbers. The devices in entry 4200 include a DirecTV DVR, a Samsung TV, and a Sony Blu Ray player, with their corresponding code sets. Because the entry 4200 includes all location-specific information, the entry 4200 can be used to program the universal remote control for the specified location. Note that entry 4200 is one suitable implementation for the location-specific programming parameters 3992 shown in FIG. 39. In one specific implementation, the external database 3990 includes many entries similar to 4200 in FIG. 42 that each specifies programming parameters for a different location. Of course, the code sets shown in FIG. 42 need not be in the entries in the external database, but could optionally be stored in the internal database 3938 shown in FIG. 39.

Referring to FIG. 43, a method 4300 is preferably performed by the dynamic location-based programming mechanism 3934 shown in FIG. 39. A location is specified (step 4310). The location can be specified in any suitable manner. One suitable manner for specifying a location is for the user to enter a unique identifier for the location. Another suitable manner is for the remote control to use its code reader to read a machine-readable representation of a unique identifier, such as a text identifier, a QR code, a barcode, or any other machine-readable identifier. The external database is then accessed by the universal remote control to determine the TV provider, channel map, devices and corresponding programming codes for the specified location (step 4320). The remote control then programs itself for the specified location using the TV provider, channel map, devices and corresponding programming codes (step 4330). While the most preferred implementation includes all of the information shown in entry 4200 in FIG. 42 for each location, in an alternative implementation the codes sets could be stored in the internal database 3938 of the universal remote control as shown in FIG. 39, while the remainder of the information is stored in entry 4200. In addition, all of the location-specific information could be distributed across multiple databases. Thus, an entry could include the location, TV provider and channel map fields shown in FIG. 42, along with a link to a different entry in a different database that specifies the devices at the location. The disclosure and claims herein expressly extend to storing location-specific programming parameters in any suitable number of locations, and accessing the location-specific programming parameters in any suitable number of locations to program the universal remote control 3910 to a specified location.

The specification herein uses different terms for phones, including cell phones, smart phones, and just "phones." These are all examples of different mobile phones. The disclosure and claims herein expressly extend to any and all mobile phones, whether currently known or developed in the future.

The specification herein discusses different types of computing devices, including smart phones, tablets, laptop computers, and desktop computers. The term "computer system" as used herein can extend to any or all of these devices, as well as other devices, whether currently known or developed in the future. In one specific context, a computer system is a laptop or desktop computer system, which is a different type than a phone or a tablet.

The disclosure herein uses some shortened terms for the sake of simplicity. For example, the word "information" is shortened in many instances to "info", the word "photograph" is shortened in many instances to "photo", the word "specifications" is shortened in some instances to "specs", and the word "medications" is shortened in some instances to "meds." Other shortened or colloquial terms may appear in the specification and drawings, which will be understood by those of ordinary skill in the art.

Many trademarks and service marks have been referenced in this patent application. Applicant has filed US federal service mark applications for "Universal Me" and for "U-Me". All other trademarks and service marks herein are the property of their respective owners, and applicant claims no rights in these other marks.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A method for programming a remote control comprising:
    configuring a location database by:
        specifying a plurality of locations;
        for each of the plurality of specified locations, specifying:
            a television provider at the specified location and a corresponding channel map that provides television channels available from the television provider along with corresponding channel numbers; and
            a plurality of devices at the specified location and corresponding programming codes for each of the plurality of devices;
    authenticating to a remote computer system that includes user settings corresponding to a user and the location database;
    specifying to the remote computer system one of the plurality of locations in the location database;
    the remote computer system comparing the user settings with location settings for the specified location stored in the location database;
    when conversion is not needed, the remote computer system downloads the user settings as suitable location settings for the specified location to the remote control;
    when conversion is needed, the remote computer system converts the user settings to the suitable location settings for the specified location and downloads the suitable location settings to the remote control;
    wherein the suitable location settings include the channel map for the television provider corresponding to the specified location and the programming codes for each of the plurality of devices at the specified location;
    dynamically programming the remote control with the suitable location settings downloaded from the remote computer system.

2. The method of claim 1 wherein the user settings comprise at least one favorite channels list.

3. The method of claim 1 wherein the user settings comprise shows set to record.

4. The method of claim 1 wherein the user settings comprise blocked channels.

5. The method of claim 1 wherein the user settings comprise parental controls.

6. The method of claim 1 wherein the user settings comprise channel numbers for stations at a preferred location for the user.

7. The method of claim 1 wherein the user settings comprise an unlock password.

* * * * *